(12) United States Patent
Kudo et al.

(10) Patent No.: US 10,621,429 B2
(45) Date of Patent: Apr. 14, 2020

(54) INDIVIDUAL IDENTIFIER EXTRACTION DEVICE

(71) Applicant: NEC Corporation, Minato-ku, Tokyo (JP)

(72) Inventors: Yuta Kudo, Tokyo (JP); Rui Ishiyama, Tokyo (JP); Toru Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 177 days.

(21) Appl. No.: 15/737,857

(22) PCT Filed: May 18, 2016

(86) PCT No.: PCT/JP2016/064701
§ 371 (c)(1),
(2) Date: Dec. 19, 2017

(87) PCT Pub. No.: WO2017/002475
PCT Pub. Date: Jan. 5, 2017

(65) Prior Publication Data
US 2019/0005326 A1 Jan. 3, 2019

(30) Foreign Application Priority Data
Jun. 30, 2015 (JP) .................................. 2015-130912

(51) Int. Cl.
*G06K 9/32* (2006.01)
*G06K 9/00* (2006.01)
*G06K 19/10* (2006.01)
*G06K 19/08* (2006.01)

(52) U.S. Cl.
CPC ....... *G06K 9/00577* (2013.01); *G06K 9/3216* (2013.01); *G06K 19/086* (2013.01); *G06K 19/10* (2013.01)

(58) Field of Classification Search
CPC .. G06K 9/00577; G06K 9/3216; G06K 19/10; G06K 19/086; G06T 7/60; G06T 7/73; G06T 2207/30168
USPC .......................................................... 382/190
See application file for complete search history.

(56) References Cited

U.S. PATENT DOCUMENTS

| 5,543,911 A | 8/1996 | Jeffers |
| 2005/0019556 A1* | 1/2005 | Freeman .......... G06K 19/06009 428/328 |
| 2005/0213818 A1* | 9/2005 | Suzuki ................. G06K 9/4609 382/190 |

(Continued)

FOREIGN PATENT DOCUMENTS

| JP | H08-106567 A | 4/1996 |
| JP | 2001-296802 A | 10/2001 |

(Continued)

OTHER PUBLICATIONS

International Search Report for PCT Application No. PCT/JP2016/064701, dated Jun. 14, 2016.

*Primary Examiner* — Ali Bayat

(57) ABSTRACT

An individual identifier extraction device has: an acquisition part configured to acquire an image of a layer formed on an object, containing fine particles, and having an irregular planar shape; and an extraction part configured to extract a feature quantity dependent on the planar shape of the layer and the distribution of the particles as an individual identifier of the object from the image.

9 Claims, 27 Drawing Sheets

(56) References Cited

U.S. PATENT DOCUMENTS

| | | | |
|---|---|---|---|
| 2005/0239207 A1 | 10/2005 | Gelbart | |
| 2007/0023715 A1 | 2/2007 | Ross et al. | |
| 2008/0192992 A1* | 8/2008 | Moshe | G07D 7/1205 |
| | | | 382/124 |
| 2012/0154567 A1* | 6/2012 | Yamaguchi | A61B 1/0638 |
| | | | 348/68 |
| 2016/0267348 A1* | 9/2016 | Kondo | G06K 9/2036 |

FOREIGN PATENT DOCUMENTS

| | | |
|---|---|---|
| JP | 2007-534067 A | 11/2007 |
| JP | 2013-058053 A | 3/2013 |
| JP | 2013-069188 A | 4/2013 |
| JP | 2014-006840 A | 1/2014 |

* cited by examiner

FIG. 4

| INDIVIDUAL IDENTIFIER | ATTRIBUTE VALUE 1 | ATTRIBUTE VALUE 2 | ... |
|---|---|---|---|
| 10110···001 | PQ001 | 18564 | ... |
| 01101···101 | QR003 | 18564 | ... |
| ⋮ | ⋮ | ⋮ | ⋮ |

INDIVIDUAL IDENTIFIER EXTRACTION DEVICE

This application is a National Stage Entry of PCT/JP2016/064701 filed on May 18, 2016, which claims priority from Japanese Patent Application 2015-130912 filed on Jun. 30, 2015, the contents of all of which are incorporated herein by reference, in their entirety.

TECHNICAL FIELD

The present invention relates to an individual identifier extraction device, an individual identifier extraction method, an identification device, a verification device, an identification method, a verification method, an identification and verification device, an identification and verification method, an individual identification mark, a program, an individual identifier registration device, an individual identifier registration method, an individual identifier management system, and an individual identifier management method.

BACKGROUND ART

As individual identification technologies for identifying the identify of an individual such as an industrial product and a commercial product, various kinds are proposed and practically used; for example, a barcode, a serial number, and an IC tag. One of the individual identification technologies is a technology to form a layer containing fine granules on an object, extracting a feature quantity from an image obtained by imaging the layer, and setting the extracted feature quantity as an individual identifier of the object.

For example, Patent Documents 1, 2 and 3 describe techniques to use a taggant (an additive for tracking) as fine particles and form a layer containing the taggant on an object, take an image of a predetermined region of the layer and set the distribution of the particles in the predetermined region extracted from the image as a feature quantity (an individual identifier of the object).

To be specific, in Patent Document 1, a taggant distributed layer is formed entirely or partially on the surface of a reference object by applying printing ink containing a taggant, and a feature quantity extracted from an image obtained by reading the taggant distributed layer is set as an individual identifier of the reference object. At the time of verification of a target object, under the same conditions for reading such as orientation, position and range as those for reading the reference object, an image of a taggant distributed layer on the target object is read, and a feature quantity extracted from the image is compared with the individual identifier of the reference object.

Further, in Patent Document 2, an origin which becomes a fiducial point for positioning is set on each object, a feature quantity is extracted from a predetermined region of a two-dimensional plane on which a rightward direction from the origin is a positive direction of an X-axis and a downward direction from the origin is a positive direction of a Y-axis, and the extracted feature quantity is set as an individual identifier of the object.

Further, in Patent Document 3, a fiducial part is put on an object (the fiducial part is, for example, a positioning mark, a line, a company logo, a frame, and an edge or a combination of edges of the object), and a coating material containing a taggant, or the like, is sprayed and a random pattern is attached so as to cover at least the fiducial part. Then, a feature quantity depending on the distribution of the taggant is extracted from an image of the fiducial part and is set as an individual identifier of the object.

Patent Document 1: Japanese Unexamined Patent Application Publication No. JP-A 2013-069188
Patent Document 2: Japanese Unexamined Patent Application Publication No. JP-A 2014-006840
Patent Document 1: Japanese Unexamined Patent Application Publication (Translation of PCT Application) No. JP-A 2007-534067

In the individual identification techniques according to Patent Documents 1 to 3 described above, a position and a range for extracting a feature quantity used as an individual identifier are defined for each object. The definition of the position and the range on an object varies with change of the outline and the size of an object. Therefore, application of the individual identification techniques according to Patent Documents 1 to 3 is limited to objects having the same outline and size, and it is difficult to generally apply the techniques to multiple kinds of objects having different outlines and sizes.

SUMMARY

An object of the present invention is to provide an individual identification technique to solve the abovementioned problem.

An individual identifier extraction device according to an aspect of the present invention includes:

an acquisition part configured to acquire an image of a layer, the layer being formed on an object and containing fine particles and having an irregular planar shape; and an extraction part configured to extract a feature quantity dependent on the planar shape of the layer and distribution of the particles as an individual identifier of the object from the image.

Further, an individual identifier extraction method as another aspect of the present invention includes:

acquiring an image of a layer, the layer being formed on an object and containing fine particles and having an irregular planar shape; and extracting a feature quantity dependent on the planar shape of the layer and distribution of the particles as an individual identifier of the object from the image.

Further, an individual identifier registration device as another aspect of the present invention includes:

an attaching part configured to generate a layer containing fine particles and having an irregular planar shape on an object;

an acquisition part configured to acquire an image of the generated layer; and an extraction part configured to extract a feature quantity dependent on the planar shape of the layer and distribution of the particles as an individual identifier of the object from the image.

Further, an individual identifier registration method as another aspect of the present invention includes:

generating a layer containing fine particles and having an irregular planar shape on an object;

acquiring an image of the generated layer; and extracting a feature quantity dependent on the planar shape of the layer and distribution of the particles as an individual identifier of the object from the image.

Further, an identification and verification device as another aspect of the present invention includes:

an acquisition part configured to acquire an image of a layer, the layer being formed on an object and containing fine particles and having an irregular planar shape;

an extraction part configured to extract a feature quantity dependent on the planar shape of the layer and distribution of the particles as an individual identifier of the object from the image; and a determination part configured to compare the individual identifier extracted by the extraction part with a registered object individual identifier stored in a storage part and, on a basis of a comparison result, determine identification and verification of the object.

Further, an identification and verification method as another aspect of the present invention includes:

acquiring an image of a layer, the layer being formed on an object and containing fine particles and having an irregular planar shape;

extracting a feature quantity dependent on the planar shape of the layer and distribution of the particles as an individual identifier of the object from the image; and comparing the extracted individual identifier with a registered object individual identifier stored in a storage part and, on a basis of a comparison result, determining identification and verification of the object.

Further, an individual identifier management system as another aspect of the present invention includes the individual identifier registration device according to the other aspect of the present invention and the identification and verification device according to the other aspect of the present invention.

Further, an individual identifier management method as another aspect of the present invention executes the individual identifier registration method according to the other aspect of the present invention and the identification and verification method according to the other aspect of the present invention.

Further, a computer program as another aspect of the present invention includes instructions for causing a computer to functions as:

an acquisition part configured to acquire an image of a layer, the layer being formed on an object and containing fine particles and having an irregular planar shape; and an extraction part configured to extract a feature quantity dependent on the planar shape of the layer and distribution of the particles as an individual identifier of the object from the image.

Further, an individual identification mark as another aspect of the present invention is formed by a layer, the layer being formed on an object and containing fine particles and having an irregular planar shape, a feature quantity dependent on the planar shape of the layer and distribution of the particles being extracted as an individual identifier of the object from the image of the layer.

With the configurations described above, the present invention can provide an individual identification technique which can be generally applied to multiple kinds of objects having difference outlines and sizes.

BRIEF DESCRIPTION OF DRAWINGS

FIG. 4 is a diagram showing an example of data registered into a storage part by the individual identifier registration device according to the second exemplary embodiment of the present invention;

EXEMPLARY EMBODIMENTS

First, in order to facilitate understanding of exemplary embodiments of the present invention, the background of the present invention will be described.

For the purpose of securing traceability of a distributed object, an individual identifier such as a barcode and an IC tag is generally used. However, such an individual identifier is easily counterfeited. Regarding such a problem, traceability is secured by putting a layer containing a taggant on an object and setting the distribution of taggant particles as an individual identifier.

However, any of the abovementioned individual identifiers cannot be used as an identifier common to multiple kinds of objects or a large number of objects. This is because, in general, a usable individual identifier and a position to extract a feature quantity of an individual identifier vary for each of the kinds of individuals, and therefore, an imaging device and a verification device dedicated to each of the kinds of individuals. Moreover, the cost of attachment of an IC tag is high. The cost of, for example, printing of a barcode and a serial number becomes higher as the number of individuals becomes larger. Furthermore, there is also a problem that if a target individual is a small component, it is difficult to secure a space for printing a barcode or the like.

According to exemplary embodiments of the present invention to be described below, the abovementioned problems are solved, and an individual identifier which can be verified at low costs and at high speeds.

Next, exemplary embodiments of the present invention will be described in detail with reference to the drawings.

First Exemplary Embodiment

Figure 1:
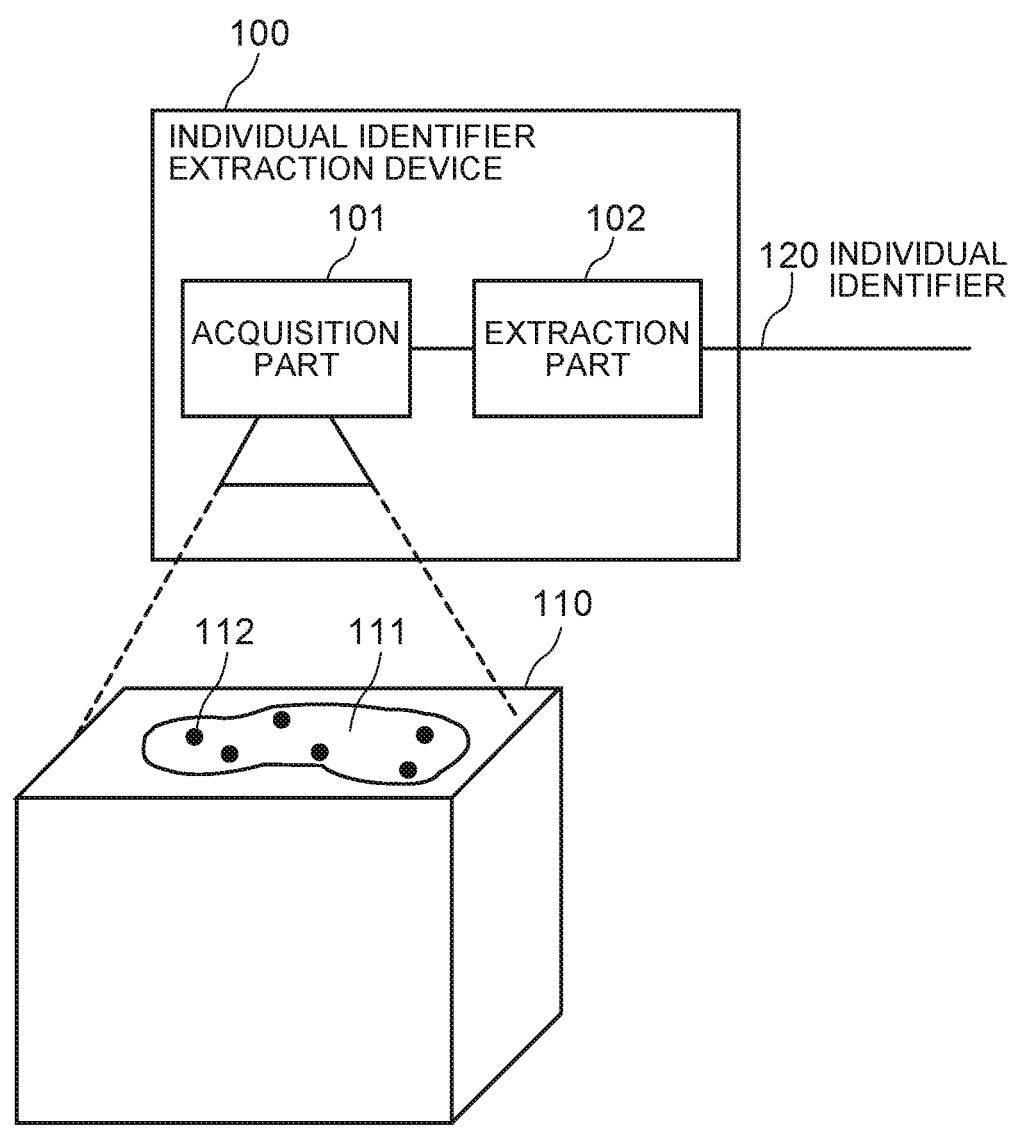
FIG. 1 is a block diagram of an individual identifier extraction device according to a first exemplary embodiment of the present invention.

With reference to FIG. 1, an individual identifier extraction device 100 according to a first exemplary embodiment of the present invention has a function to extract an individual identifier 120 of an object 110.

The object 110 is a target from which an individual identifier is extracted, such as an industrial product and a product package. On any of the faces of the object 110, a layer 111 is formed. In FIG. 1, the outline of the object 110 is a rectangular parallelepiped, but the outline of the object 110 is not limited to a rectangular parallelepiped and can be any shape. Moreover, FIG. 1 shows only one object 110 from which an individual identifier is extracted, but in general, a number of objects 110 become targets from which individual identifiers are extracted. In this case, a number of objects 110 may be a set of the same kind of objects having the same outline (for example, specific electronic components manufactured on a certain factory line), or may include a set of different kinds of objects having different outlines and sizes (for example, electronic components having different outlines and functions manufactured on a plurality of factory lines different from each other).

The layer 111 contains fine particles 112 at random positions. As the fine particles 112, microparticles such as metal powder and glass powder, the taggant described in Patent Documents 1 to 3, and the like, can be used. The fine particles 112 are desired to be particles having a different reflection characteristic from a material (except the fine particles 112) configuring the layer 111. Moreover, it is desirable that the fine particles 112 are ununiformly contained by the layer 111. The planar shape of the layer 111 is an irregular shape. The planar shape of the layer 111 is a shape seen from above the layer 111. The layer 111 can be formed by, for example, putting only one drop of printing ink, paint or the like containing the fine particles 112 on the surface of the object 110 with the use of a pen or the like and solidifying it. However, a method for forming the layer 111 is not limited to the above method, and any other method may be used; for example, applying printing ink, paint or the like containing the fine particles 112 with the use of a brush or the like.

The individual identifier extraction device 100 has, as major function parts, an acquisition part 101 and an extraction part 102.

The acquisition part 101 has a function to acquire an image of the layer 111 formed on the object 110. The acquisition part 101 acquires an image showing the planar shape of the layer 111. Moreover, the acquisition part 101 acquires an image having a quality enabling extraction of a feature quantity dependent on the distribution of the particles 112 contained by the layer 111.

The extraction part 102 has a function to extract, from an image acquired by the acquisition part 101, a feature quantity dependent on the planar shape of the layer 111 and the distribution of the particles 112 as the individual identifier 120 of the object 110. A feature quantity extracted from an image by the extraction part 102 can be any kind as far as it is a feature quantity dependent on the planar shape of the layer 111 and the distribution of the particles 112.

Figure 2:
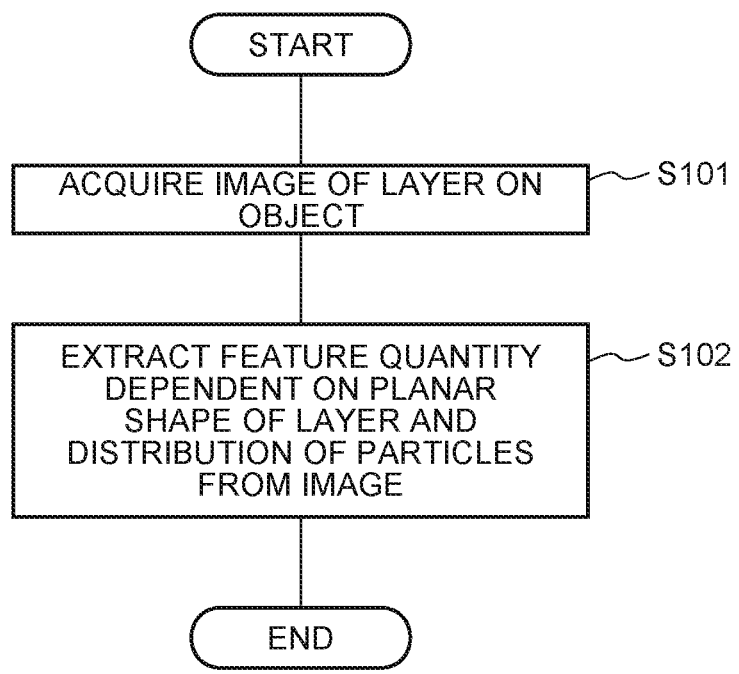
FIG. 2 is a flowchart showing a procedure of an individual identifier extraction method executed by the individual identifier extraction device according to the first exemplary embodiment of the present invention.

FIG. 2 is a flowchart showing a procedure of an individual identifier extraction method executed by using the individual identifier extraction device 100. With reference to FIGS. 1 and 2, the individual identifier extraction method according to this exemplary embodiment will be described.

First, the acquisition part 101 of the individual identifier extraction device 100 acquires an image of the layer 111 formed on the object 110 (step S101).

Next, the extraction part 102 of the individual identifier extraction device 100 extracts, from the image of the layer 111 acquired by the acquisition part 101, a feature quantity dependent on the planar shape of the layer 111 and the distribution of the particles 112 as the individual identifier 120 of the object 110 (step S102).

Thus, according to this exemplary embodiment, the following effects can be obtained.

According to this exemplary embodiment, it is possible to obtain the individual identifier extraction device 100 that can be generally applied to multiple kinds of objects whose outlines, sizes and so on are different. This is because a feature quantity dependent on the planar shape of the layer 111 and the distribution of the particles 112 is extracted as an individual identifier of the object 110 from an image of the layer 111 formed on the object 110 and having an irregular planar shape. That is, in this exemplary embodiment, it is sufficient that an image of the layer 111 formed on the object 110 can be acquired, and there is no need to regulate a position and range to acquire an image for each of objects having different outlines, sizes or the like.

Further, according to this exemplary embodiment, it is possible to make an identification capability, which is the degree of ability to identify a different individual, higher than in the case of extracting a feature quantity dependent on the distribution of the particles 112 from a fixed region of the layer 111. This is because in the case of extracting a feature quantity dependent on the planar shape of the layer 111 and the distribution of the particles 112, if the distribution of the particles 112 in a fixed region of the layer 111 is similar and the planar shape of the layer is not similar, there is a possibility that due to a difference in position and size of feature quantity extraction regions, extracted feature quantities are not similar to each other.

Second Exemplary Embodiment

Figure 3:
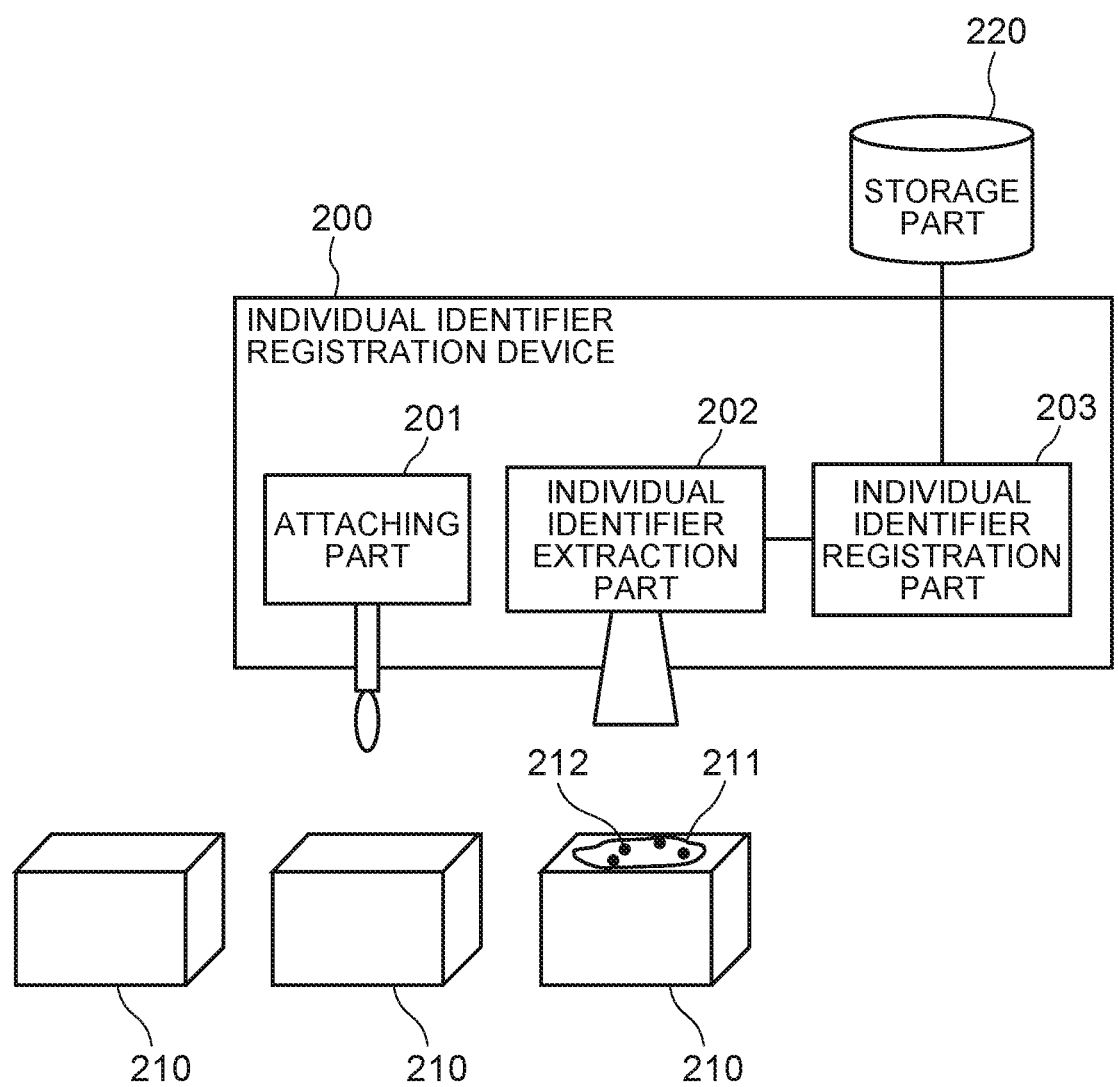
FIG. 3 is a block diagram of an individual identifier registration device according to a second exemplary embodiment of the present invention.

With reference to FIG. 3, an individual identifier registration device 200 according to a second exemplary embodiment of the present invention has a function to provide an individual identifier to an object 210.

The object 210 is a target to which an individual identifier is attached, such as an industrial product and a product package. In FIG. 3, the outline of the object 210 is a rectangular parallelepiped, but the outline of the object 210 is not limited to a rectangular parallelepiped and may be any shape. Moreover, FIG. 3 shows only three objects 210 to which individual identifiers are attached, but in general, a number of objects 210 become targets to which individual identifiers are attached. In this case, a number of objects 210 may be a set of the same kind of objects having the same outline (for example, specific electronic components manufactured on a certain factory line), or may include a set of different kinds of objects having different outlines and sizes (for example, electronic components having different outlines and functions manufactured on a plurality of factory lines different from each other).

The individual identifier registration device 200 has, as major components, an attaching part 201, an individual identifier extraction part 202, and an individual identifier registration part 203.

The attaching part 201 has a function to generate a layer 211 containing fine particles 212 at random positions and having an irregular planar shape on the object 210. As the fine particles 212, the same particles as the fine particles 112 described with reference to FIG. 1 can be used. The attaching part 201 generates the layer 211 by, for example, putting only one drop of printing ink, paint or the like containing the fine particles 212 on the surface of the object 210. For example, the attaching part 201 can be readily realized by a pen using printing ink containing the fine particles 212. However, a method for generating the layer 211 is not limited to the above method, and any other method may be used; for example, applying printing ink, paint or the like containing the fine particles 212 with the use of a brush or the like.

The individual identifier extraction part 202 has a function to acquire an image of the layer 211 formed on the object 210 by the attaching part 201 and extract a feature quantity dependent on the planar shape of the layer 211 and the distribution of the particles 212 as an individual identifier of the object 210 from the acquired image. The individual identifier extraction part 202 is configured by, for example, the individual identifier extraction device 100 according to the first exemplary embodiment of the present invention.

The individual identifier registration part 203 has a function to register an individual identifier of the object 210 extracted by the individual identifier extraction part 202 as a registered object individual identifier into a storage part 220. When registering an individual identifier of the object 210, the individual identifier registration part 203 may register the individual identifier so as to be associated with one or more attribute values of the object 210. Any kind and number of attribute values of an object may be registered. For example, in a case where the object 210 is an industrial product, a product package or the like, attribute values are, for example, a model number, a production lot number, and a number of a device used for processing the object. The individual identifier registration part 203 may acquire one or more attribute values of the object 210 by any method. For example, the individual identifier registration part 203 may be configured to acquire an attribute value of the object 210 from an input device such as a keyboard and a barcode reader which are not shown.

FIG. 4 shows an example of data registered in the storage part 220. In this example, an individual identifier of the object 210 is registered so as to be associated with a plurality of attribute values 1, 2 . . . of the object 210. For example, data on the first line represents that the individual value of a certain object 210 is 10110 . . . 001, the attribute value 1 is PQ001, the attribute value 2 is 18564 . . . . Herein, an individual identifier is an N-dimensional vector (N≥2), but may have any data structure.

Figure 5:
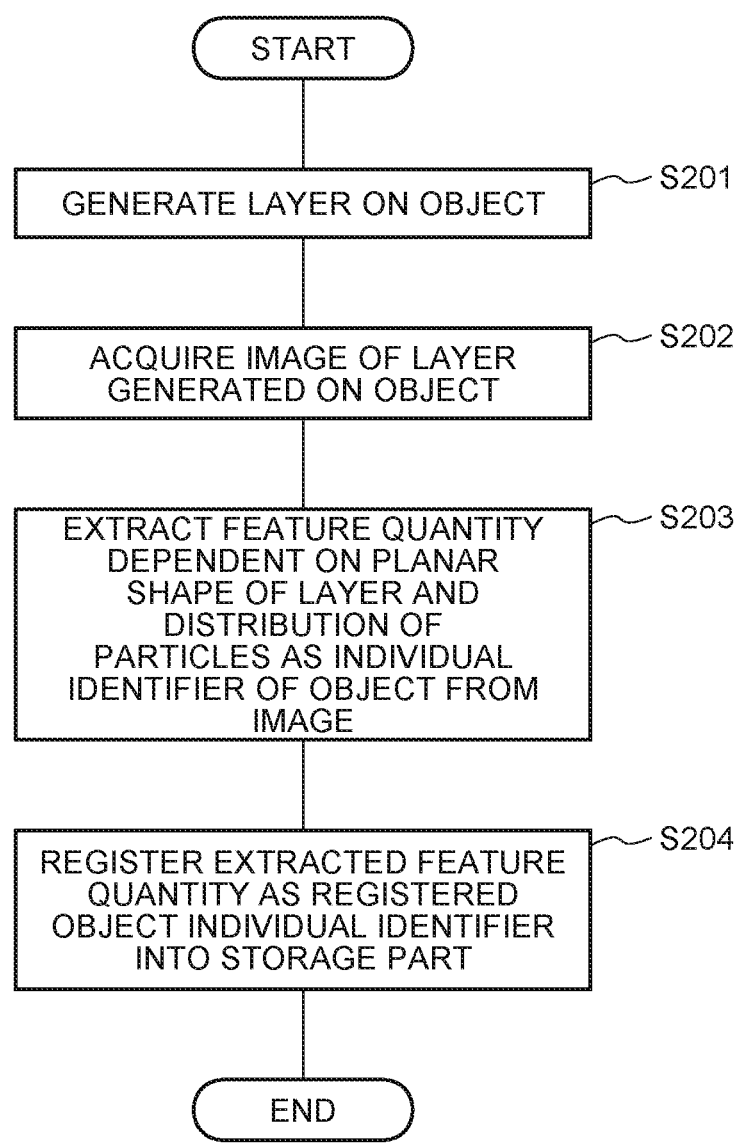
FIG. 5 is a flowchart showing a procedure of an individual identifier registration method executed by the individual identifier registration device according to the second exemplary embodiment of the present invention.

FIG. 5 is a flowchart showing a procedure of an individual identifier registration method executed by using the individual identifier registration device 200. With reference to FIGS. 3 to 5, the individual identifier registration method according to this exemplary embodiment will be described below.

First, the attaching part 201 of the individual identifier registration device 200 generates the layer 211 containing the fine particles 212 at random positions and having an irregular planar shape on the object 210 (step S201). This can be realized by a simple method; for example, in a case where the attaching part 201 is a pen using ink containing the fine particles 212, writing dots on the object 210 with the use of the pen.

Next, the individual identifier extraction part 202 of the individual identifier registration device 200 acquires an image of the layer 211 formed on the object 210 (step S202). This can be realized by a simple method; for example, imaging the layer 211 with the use of a camera. Then, the individual identifier extraction part 202 extracts a feature quantity dependent on the planar shape of the layer 211 and the distribution of the particles 212 as an individual identifier of the object 210 from the acquired image of the layer 211 (step S203).

Next, the individual identifier registration part 203 of the individual identifier registration device 200 registers the extracted individual identifier of the object 210 into the storage part 220 so as to be associated with attribute values of the object (step S204).

The individual identifier registration device 200 repeatedly executes the abovementioned process on each of the objects 210. In order to efficiently repeat execution of the process, the individual identifier registration device 200 may convey each of the objects 210 to a place where the attaching part 201 generates the layer and convey the object 210 with the layer generated to a place where the individual identifier extraction part 202 acquires an image of the layer.

Thus, according to this example embodiment, the following effects can be obtained.

According to this exemplary embodiment, it is possible to obtain the individual identifier registration device 200 that can be applied generally to multiple kinds of objects having different outlines, sizes and so on and is excellent in productivity. This is because the layer 211 containing the fine particles 212 and having an irregular planar shape is generated on the object 210 and a feature quantity dependent on the planar shape of the layer 211 and the distribution of the particles 212 is extracted as an individual identifier of the object 210 from an image of the generated layer 211. That is, it is sufficient that the layer 211 having an irregular planar shape can be generated on an object, and there is no need to individually regulate a position and range to form a layer for each of objects having different outlines, sizes and so on. Moreover, it is sufficient that an image of the layer 211 generated on the object 210 can be acquired, and there is no need to individually regulate a position and range to acquire an image for each of objects having different outlines, sizes and so on.

Further, according to this exemplary embodiment, it is possible to provide the object 210 with an individual identifier having a higher identification capability, which is the degree of ability to identify a different individual, than in the case of extracting a feature quantity dependent on the distribution of the particles 212 from a fixed region of the layer 211. This is because in the case of extracting a feature quantity dependent on the planar shape of the layer 211 and the distribution of the particles 212, if the planar shapes of the layers are not similar though the distributions of the particles 212 in fixed regions of the layers 211 are similar, extracted feature quantities are not similar to each other due to, for example, a difference in position and size of feature extraction regions.

Third Exemplary Embodiment

Figure 6:
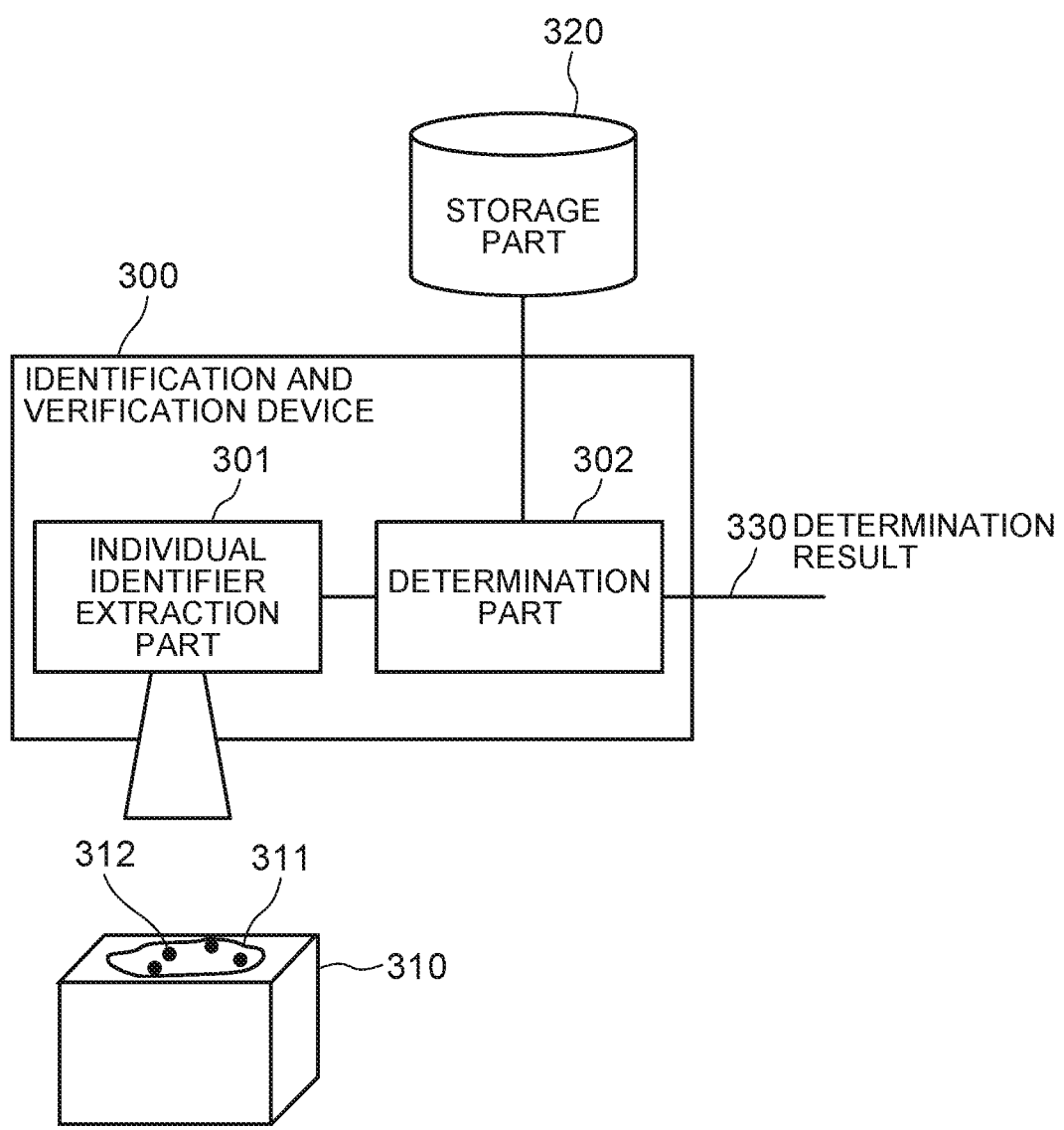
FIG. 6 is a block diagram of an identification and verification device according to a third exemplary embodiment of the present invention.

With reference to FIG. 6, an identifier verification device 300 according to a third exemplary embodiment of the present invention has a function to identify and verify an object 310.

The object 310 is an object to become the target of identification and verification, such as an industrial product and a product package. On any of the faces of the object 310, a layer 311 is formed. In FIG. 6, the outline of the object 310 is a rectangular parallelepiped, but the outline of the object 310 is not limited to a rectangular parallelepiped and can be any shape. Moreover, FIG. 6 shows only one object 310 as the target of identification and verification, but in general, a number of objects 310 become the targets of identification and verification. In this case, a number of objects 310 may be a set of the same kind of objects having the same outline (for example, specific electronic components manufactured on a certain factory line), or may include a set of different kinds of objects having different outlines and sizes (for example, electronic components having different outlines and functions manufactured on a plurality of factory lines different from each other).

The layer 311 contains fine particles 312 at random positions. As the fine particles 312, the same particles as the fine particles 112 described with reference to FIG. 1 can be used. Moreover, the planar shape of the layer 311 is an irregular shape. The object 310 having the layer 311 can be produced by, for example, the individual identifier registration device 200 according to the second exemplary embodiment of the present invention.

The identification and verification device 300 has an individual identifier extraction part 301 and a determination part 302 as major function parts.

The individual identifier extraction part 301 has a function to acquire an image of the layer 311 formed on the object 310 and extract a feature quantity dependent on the planar shape of the layer 311 and the distribution of the particles 312 as an individual identifier of the object 310 from the acquired image. The individual identifier extraction part 301 is configured by, for example, the individual identifier extraction device 100 according to the first exemplary embodiment of the present invention.

The determination part 302 has a function to compare an individual identifier extracted by the individual identifier extraction part 301 with a registered object individual identifier stored in the storage part 320 and perform determination of identification and verification of an object on the basis of the comparison result. In the storage part 320, a registered object individual identifier is previously stored by the individual identifier registration device 200 according to the second exemplary embodiment of the present invention, for example.

Figure 7:
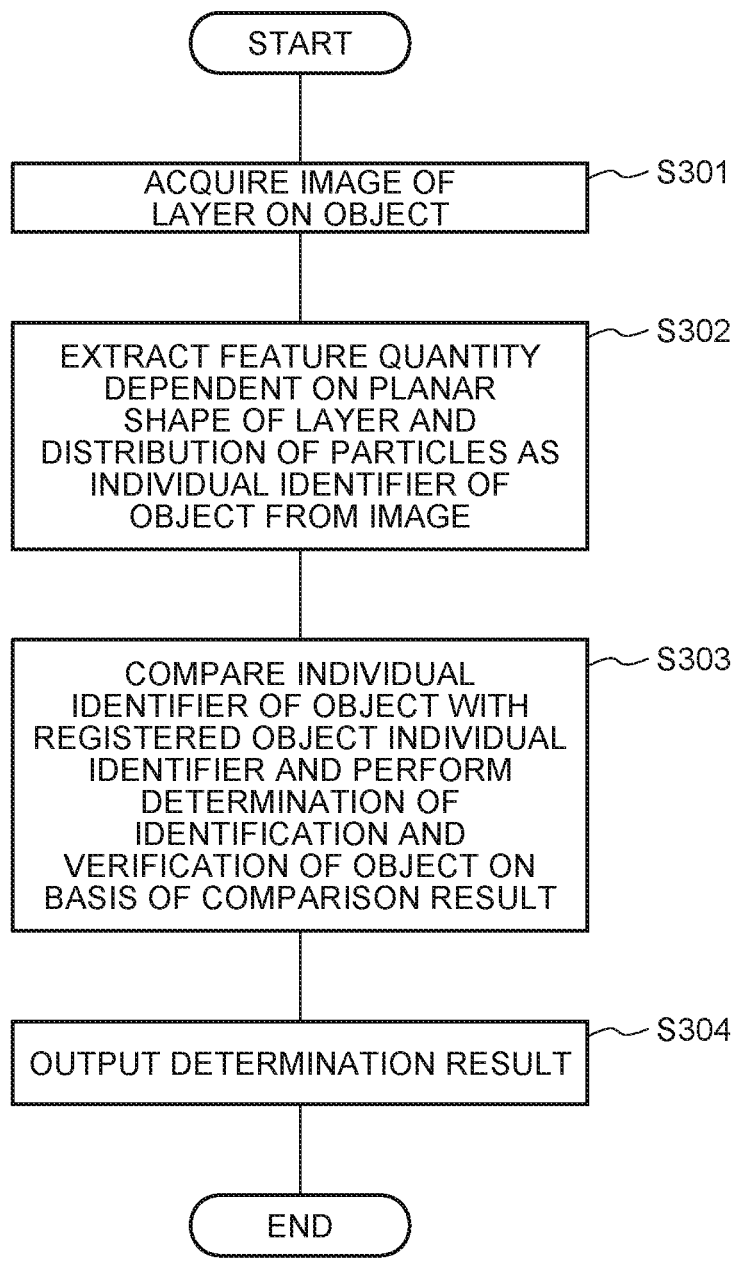
FIG. 7 is a flowchart showing a procedure of an identification and verification method executed by the identification and verification device according to the third exemplary embodiment of the present invention.

FIG. 7 is a flowchart showing a procedure of an identification and verification method executed by using the identification and verification device 300. With reference to FIGS. 6 and 7, the identification and verification method according to this exemplary embodiment will be described below.

First, the individual identifier extraction part 301 of the identification and verification device 300 acquires an image of the layer 311 formed on the object 310 (step S301). Then, the individual identifier extraction part 301 extracts a feature quantity dependent on the planar shape of the layer 311 and the distribution of the particles 312 as an individual identifier of the object 310 from the acquired image of the layer 311 (step S302).

Next, the determination part 302 of the identification and verification device 300 compares the extracted individual identifier of the object 310 with a registered object individual identifier stored in the storage part 320 and, on the basis of the comparison result, performs determination of identification and verification of an object (step S303). For example, in a case where an individual identifier is an N-dimensional vector, the determination part 302 calculates a similarity (or a distance) between a vector of the individual identifier of the object 310 and a vector of the registered object individual identifier, and determines the two individual identifiers are identical in a case where the similarity is equal to or more than a threshold (the distance is equal to or less than a threshold), and determines the two individual identifiers are not identical in the other cases. The determination part 302 finishes repeatedly executing the process of determination of object identification and verification in a case where one of the following conditions is satisfied; a registered object individual identifier which is identical to the individual identifier of the object 310 is found, or comparison of the individual identifier of the object 310 with all the registered object individual identifiers is finished. Then, the determination part 302 outputs a determination result 330. The determination result 330 can represent whether identification and verification has succeeded. Moreover, when identification and verification has succeeded, the determination result 330 can include an attribute value of an object stored in the storage part 320 so as to be associated with the registered object individual identifier determined as identical.

Thus, according to this exemplary embodiment, the following effects can be obtained.

According to this exemplary embodiment, it is possible to obtain the identification and verification device 300 that can be applied generally to multiple kinds of objects having different outlines, sizes and so on. This is because identification and verification of an object is performed by extracting a feature quantity dependent on the planar shape of the layer 311 and the distribution of the particles 312 as an individual identifier of the object 310 from an image of the layer 311 formed on the object 310 and having an irregular planar shape, and comparing the extracted individual identifier with registered object individual identifiers. That is, in this exemplary embodiment, it is sufficient that an image of the layer 311 formed on the object 310 can be acquired, and there is no need to individually regulate a position and range to acquire the image for each of objects having different outlines, sizes and so on.

Further, according to this exemplar embodiment, it is possible to make an identification and verification capability, which is the degree of an ability to identify and verify a different individual, higher than in the case of extracting a feature quantity dependent on the distribution of the particles 312 from a fixed region of the layer 311. This is because in the case of extracting a feature quantity dependent on the planar shape of the layer 311 and the distribution of the particles 312, if the planar shapes of the layers are not similar though the distributions of the particles 312 in fixed regions of the layers 311 are similar, extracted feature quantities are not similar to each other due to, for example, a difference in position and size of feature extraction regions.

Fourth Exemplary Embodiment

Figure 8:
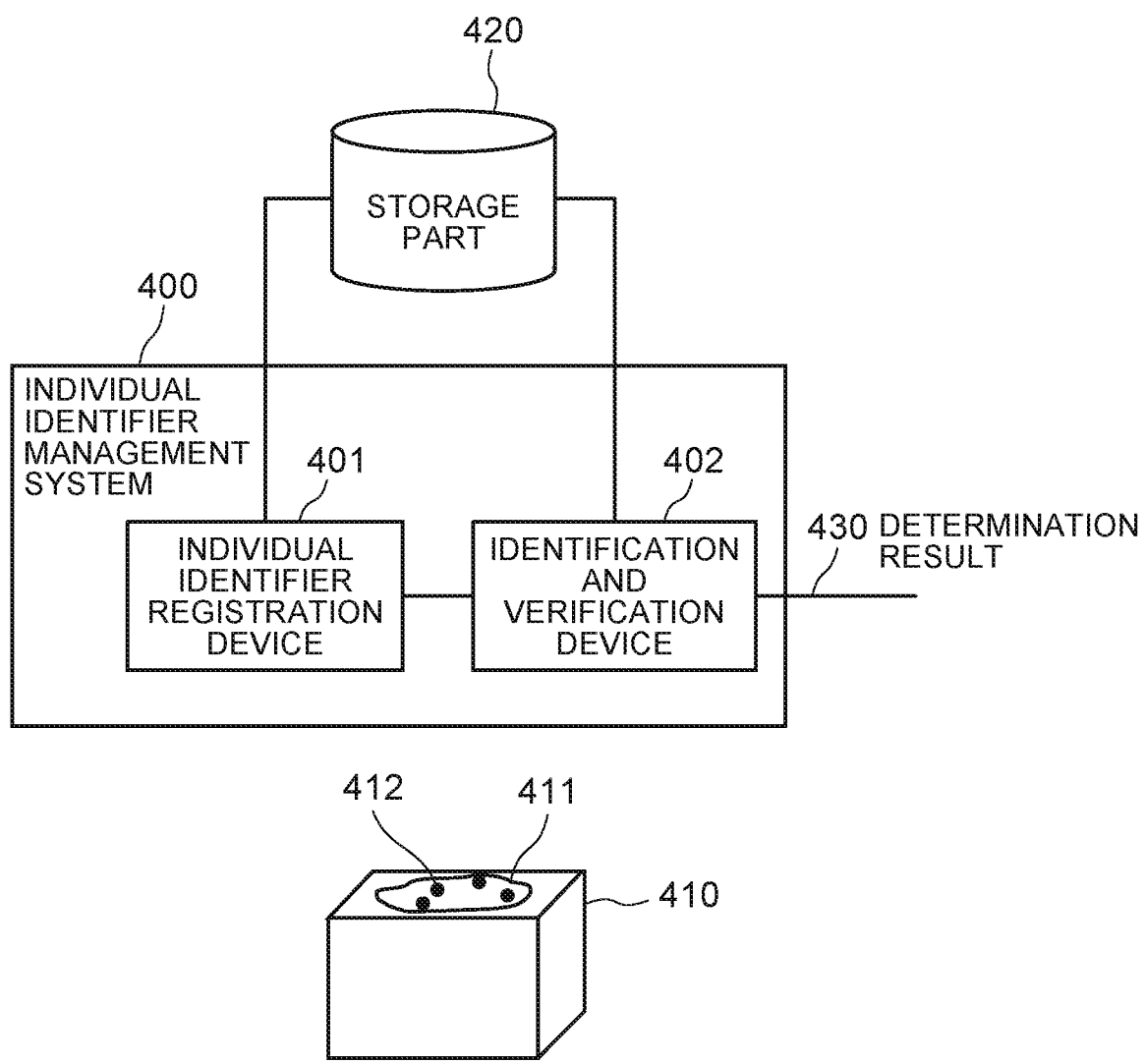
FIG. 8 is a block diagram of an individual identifier management device according to a fourth exemplary embodiment of the present invention.

With reference to FIG. 8, an individual identifier management system 400 according to a fourth exemplary embodiment of the present invention has a function to manage an individual identifier for identifying and verifying an object 410.

The object 410 is a target for attachment and management of an individual identifier, such as an industrial product and a product package. In FIG. 8, the outline of the object 410 is a rectangular parallelepiped, but the outline of the object 410 is not limited to a rectangular parallelepiped and may be any shape. Moreover, FIG. 8 shows only one object 410 as a target for attachment and management of an individual identifier, but in general, a number of objects 410 become targets for management. In this case, a number of objects 410 may be a set of the same kind of objects having the same outline (for example, specific electronic components manufactured on a certain factory line), or may include a set of different kinds of objects having different outlines and sizes (for example, electronic components having different outlines and functions manufactured on a plurality of factory lines different from each other).

The individual identifier management system 400 includes an individual identifier registration device 401, and an identification and verification device 402.

The individual identifier registration device 401 has: a function to generate a layer 411 containing fine particles 412 at random positions and having an irregular planar shape on the object 410; a function to acquire an image of the layer 411 generated on the object 410; a function to extract a feature quantity dependent on the planar shape of the layer 411 and the distribution of the fine particles 412 as an individual identifier of the object 410 from the acquired image of the layer 411; and a function to associate the extracted individual identifier of the object with an attribute value of the object 410 and register to the storage part 420. The individual identifier registration device 401 is configured by, for example, the individual identifier registration device 200 according to the second exemplary embodiment of the present invention.

Further, the identification and verification device 402 has: a function to acquire an image of the layer 411 formed on the object 410; a function to extract a feature quantity dependent on the planar shape of the layer 411 and the distribution of the particles as an individual identifier of the object 410 from the acquired image of the layer 411; and a function to compare the extracted individual identifier of the object with a registered object individual identifier stored in the storage part 420 and, on the basis of the comparison result, perform determination of identification and verification of the object. This identification and verification device 402 is configured by, for example, the identification and verification device 300 according to the third exemplary embodiment of the present invention.

Figure 9:
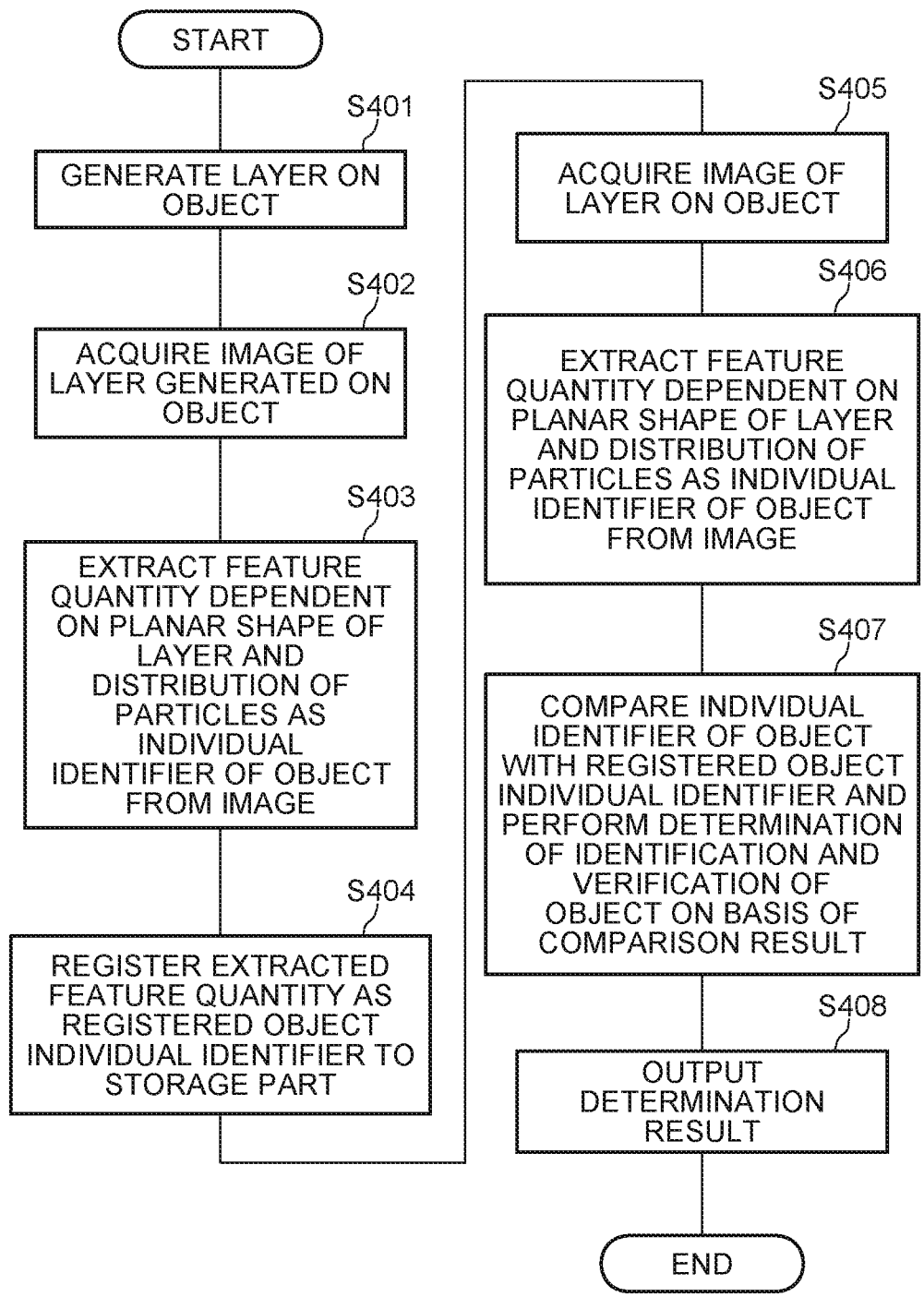
FIG. 9 is a flowchart showing a procedure of an individual identifier management method executed by the individual identifier management device according to the fourth exemplary embodiment of the present invention.

FIG. 9 is a flowchart showing a procedure of an individual identifier management method executed by using the individual identifier management system 400. With reference to FIGS. 8 and 9, the individual identifier management method according to this exemplary embodiment will be described below.

First, the individual identifier registration device 401 generates the layer 411 containing the fine particles 412 at random positions and having an irregular planar shape on the object 410 (step S401). Next, the individual identifier registration device 401 acquires an image of the layer 411 formed on the object 410 (step S402). Then, the individual identifier registration device 401 extracts a feature quantity dependent on the planar shape of the layer 411 and the distribution of the particles 412 as an individual identifier of the object 410 from the acquired image of the layer 411 (step S403). Next, the individual identifier registration device 401 associates the extracted individual identifier of the object 410 with an attribute value of the object and register to the storage part 420 (step S404).

On the other hand, the identification and verification device 402 acquires an image of the layer 411 formed on the object 410 (step S405). Next, the identification and verification device 402 extracts a feature quantity dependent on the planar shape of the layer 411 and the distribution of the particles 412 as an individual identifier of the object 410 from the acquired image of the layer 411 (step S406). Next, the identification and verification device 402 compares the extracted individual identifier of the object 410 with the registered object individual identifier stored in the storage part 420 and, on the basis of the comparison result, performs determination of identification and verification of the object (step S407). Next, the identification and verification device 402 outputs a determination result 430. The determination result 430 may represent whether identification and verification has succeeded. Moreover, in a case where identification and verification has succeeded, the determination result 430 may include an object attribute value stored in the storage part 420 so as to be associated with the registered object individual identifier determined as identical.

In the flowchart of FIG. 9, after the process of steps S401 to S404 executed by the individual identifier registration device 401, the process of steps S405 to S408 executed by the identification and verification device 402 is executed. However, the individual identifier management method is not limited to the procedure as described above, and the process of steps S401 to S404 executed by the individual identifier registration device 401 may be repeatedly executed multiple times on different objects 410. Moreover, the process of steps S405 to S408 executed by the identification and verification device 402 may be repeatedly executed multiple times on different objects 410. Otherwise, the process of steps S401 to S404 executed by the individual identifier registration device 401 and the process of steps S405 to S408 executed by the identification and verification device 402 may be executed on different objects 410 in parallel.

Thus, according to this exemplary embodiment, the following effects can be obtained.

According to this exemplary embodiment, it is possible to obtain the individual identifier management system 400 that can be generally applied to multiple kinds of objects having different outlines, sizes and so on.

This is because the individual identifier registration device 401 can be generally applied to multiple kinds of objects having different outlines, sizes and so on as described in the second exemplary embodiment and the identification and verification device 402 can be generally applied to multiple kinds of objects having different outlines, sizes and so on as described in the third exemplary embodiment.

Further, according to this exemplary embodiment, it is possible to make an identification and verification capability, which is the degree of an ability to identify and verify different individuals, higher that in the case of extracting a feature quantity dependent on the distribution of the particles 412 from a fixed region of the layer 411. This is because, in the case of extracting a feature quantity dependent on the planar shape of the layer 411 and the distribution of the particles 412, if the planar shapes of the layers are not similar though the distributions of the particles 412 in the fixed regions of the layers 411 are similar, there is a possibility that the extracted feature quantities are not similar to each other due to a difference in position and size between the feature quantity extraction regions.

Fifth Exemplary Embodiment

Figure 10:
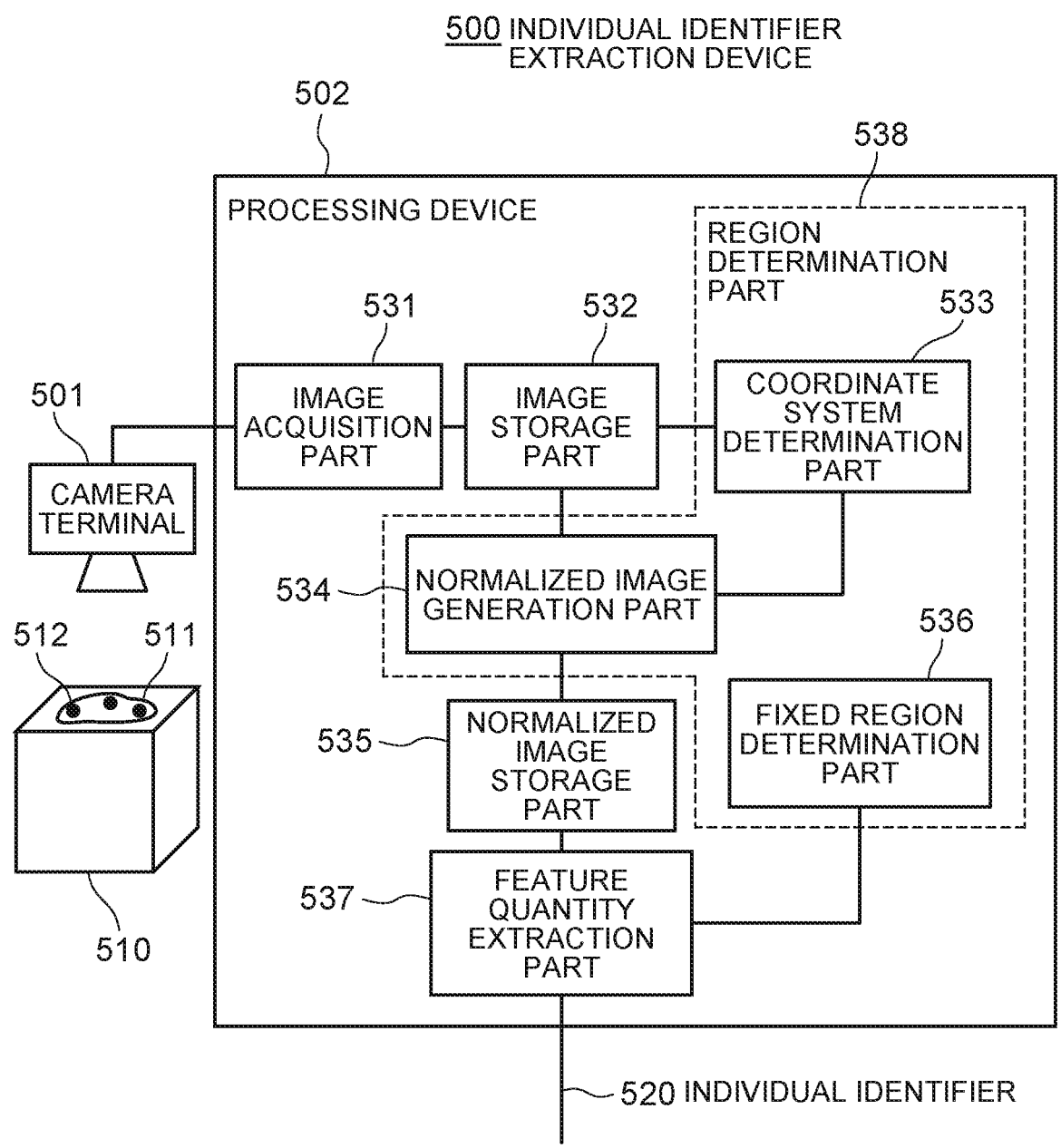
FIG. 10 is a block diagram of an individual identifier extraction device according to a fifth exemplary embodiment of the present invention.

This exemplary embodiment further embodies the individual identifier extraction device 100 according to the first exemplary embodiment of the present invention. With reference to FIG. 10, an individual identifier extraction device 500 according to a fifth exemplary embodiment of the present invention has a function to extract an individual identifier 520 of an object 510.

The object 510, the layer 511 formed on the face thereof, and the fine particles 512 contained in the layer 511 are the same as the object 110, the layer 111, and the fine particles 112 described with reference to FIG. 1.

The individual identifier extraction device 500 has a camera terminal 501 and a processing device 502 connected thereto.

The camera terminal 501 has a function to optically acquire an image of the layer 511 on the object 510, namely, an imaging function. As the camera terminal 501, for example, a camera using a CCD (Charge Coupled Device) image sensor or a CMOS (Complementary Metal Oxide) image sensor can be used.

Figure 11:
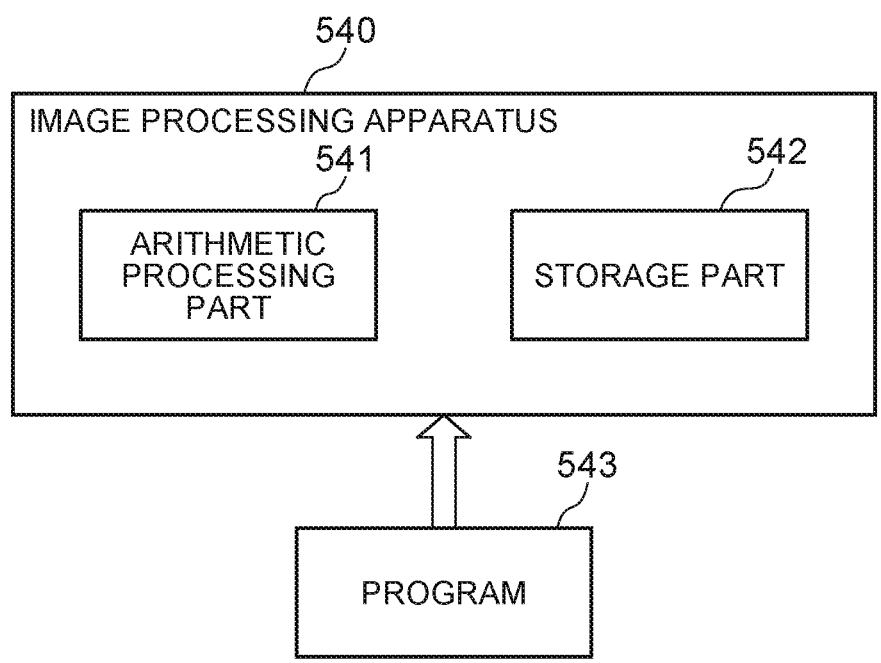
FIG. 11 is a diagram showing a configuration example of hardware of the individual identifier extraction device, the individual identifier registration device, the identification and verification device and the individual identifier management device of the present invention.

The processing device 502 has a function to extract the individual identifier 520 from an image of the layer 511 on the object 510. The processing device has, as major function parts, an image acquisition part 531, an image storage part 532, a coordinate system determination part 533, a normalized image generation part 534, a normalized image storage part 535, a fixed region determination part 536, and a feature quantity extraction part 537. The processing device 502 is realized by, for example, as shown in FIG. 11, an information processing apparatus 540 including an arithmetic processing part 541 including one or more microprocessors and a storage part 542 such as a memory and a hard disk used as the image storage part 532 and the normalized image storage part 535, and a program 543. The program 543 is loaded to the memory from an external computer-readable recording medium, for example, at the startup of the information processing apparatus 540 and controls an operation of the arithmetic processing part 541, thereby realizing functional units such as the image acquisition part 531, the coordinate system determination part 533, the normalized image generation part 534, the fixed region determination part 536 and the feature quantity extraction part 537 on the arithmetic processing part 541.

The image acquisition part 531 has a function to acquire an image of the layer 511 of the object 510 by using the camera terminal 501 and store the acquired image into the image storage part 532. The image acquisition part 531 acquires an image showing the planar shape of the layer 511 on the object 510. Moreover, the image acquisition part 531 acquires an image having a quality enabling extraction of a feature quantity dependent on the distribution of particles 512 contained by the layer 511.

The coordinate system determination part 533 has a function to determine a coordinate system which is unique to an image of the layer 511 on the basis of the entire image of the layer 511 stored in the image storage part 532. A coordinate system which is unique to an image of the layer 511 is defined with three parameters; a position of the origin, a direction of an axis, and a scale. Because a coordinate system unique to an image of the layer 511 is determined on the basis of the entire image of the layer 511, it is dependent on the planar shape of the layer 511.

The normalized image generation part 534 has a function to normalize an image of the layer 511 stored in the image storage part 532 to a normalized coordinate system and store the normalized image into the normalized image storage part 535. A normalized coordinate system is defined with three parameters; a position of the origin, a directions of an axis, and a scale.

The fixed region determination part 536 has a function to determine a predetermined region in a normalized image of the layer 511 stored in the normalized image storage part 535 as a feature quantity extraction region. A predetermined region may have any shape and size and any number of regions may be determined as predetermined regions as far as the predetermined region is a fixed region. As described above, a coordinate system unique to an image of the layer 511 is dependent on the planar shape of the layer 511, so that a normalized image and a feature quantity extraction region which is a fixed region in the normalized image are regions dependent on the planar shape of the layer 511.

The coordinate system determination part 533, the normalized image generation part 534, and the fixed region determination part 536 configure a region determination part 538 that determines a region dependent on a layer planar shape from an image of the layer 511.

The feature quantity extraction part 537 has a function to extract and output a feature quantity dependent on the distribution of the particles 512 in the feature quantity extraction region in a normalized image of the layer 511 stored in the normalized image storage part 535 as an individual identifier 520 of the object 510.

Figure 12:
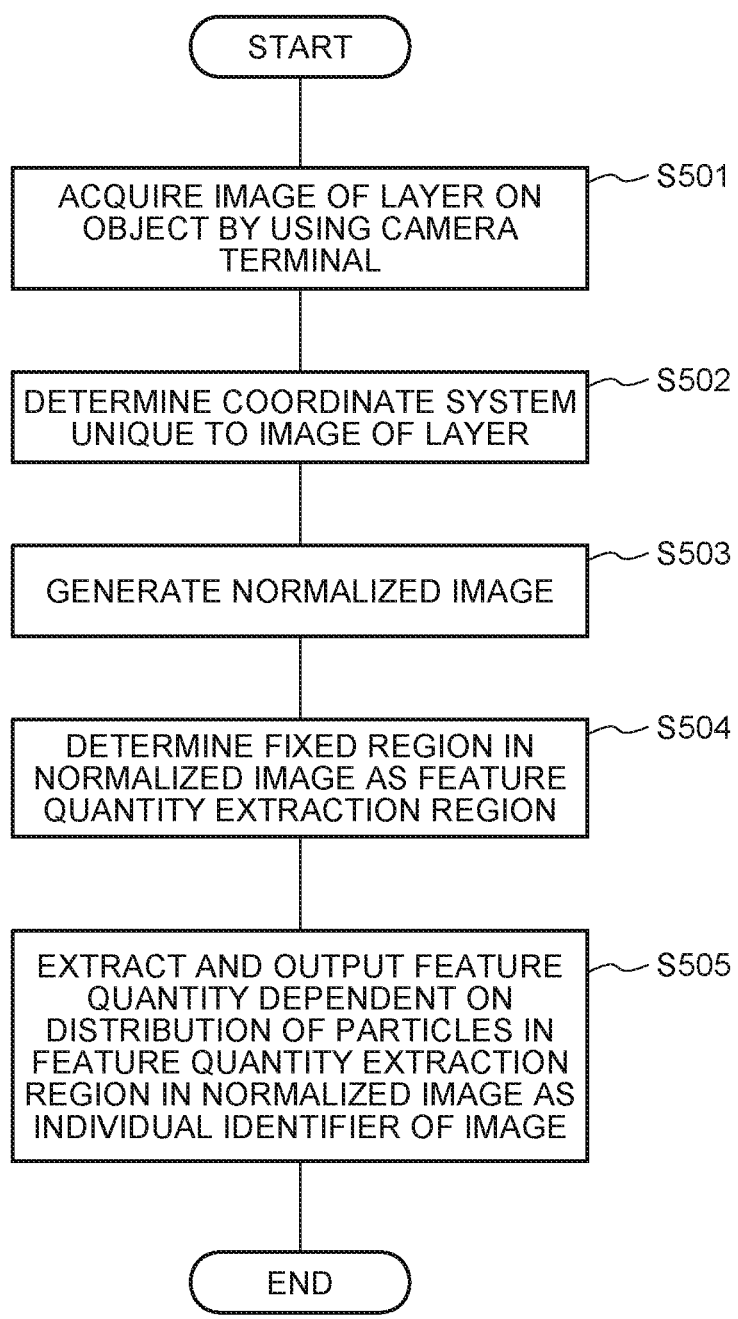
FIG. 12 is a flowchart showing an operation of a processing device of the individual identifier extraction device according to the fifth exemplary embodiment of the present invention.

FIG. 12 is a flowchart showing an operation of the processing device 502. With reference to FIGS. 10 and 12, an operation of the processing device 502 will be described below.

First, the image acquisition part 531 of the processing device 502 acquires an image of the layer 511 on the object 510 by using the camera terminal 501, and stores the acquired image into the image storage part 532 (step S501).

Next, the coordinate system determination part 533 of the processing device 502 analyzes the image of the layer 511 received from the image storage part 532, determines a coordinate system unique to the image of the layer 511, and transmits a position of the origin, a direction of an axis and a scale of the unique coordinate system to the normalized image generation part 534 (step S502).

Next, the normalized image generation part 534 of the processing device 502 normalizes the image of the layer 511 stored in the image storage part 532 on the basis of the coordinate system unique to the image of the layer 511 determined by the coordinate system determination part 533 and a normalized coordinate system, and stores the normalized image into the normalized image storage part 535 (step S503).

Next, the fixed region determination part of the processing device 502 determines a predetermined fixed region in the normalized image stored in the normalized image storage part 535 as a feature quantity extraction region and transmits to the feature quantity extraction part 537 (step S504).

Next, the feature quantity extraction part 537 of the processing device 502 extracts and outputs a feature quantity dependent on the distribution of the particles 512 in the feature quantity extraction region in the normalized image of the layer 511 stored in the normalized image storage part 535 as an individual identifier of the object 510 (step S505).

Subsequently, a specific example of the coordinate system determination part 533 will be described.

Figure 13:
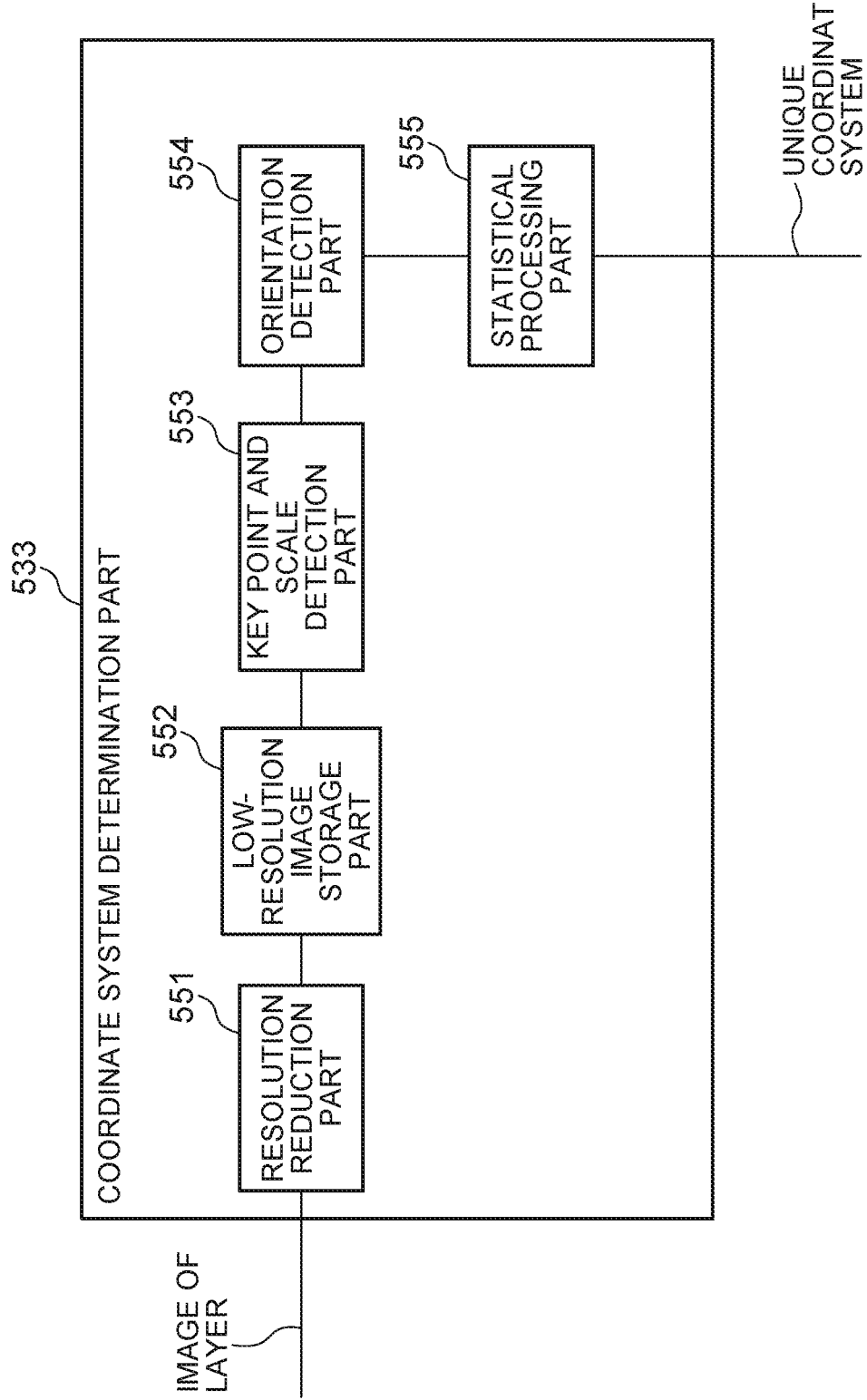
FIG. 13 is a block diagram showing a configuration example of a coordinate system determination part in the individual identifier extraction device according to the fifth exemplary embodiment of the present invention.

FIG. 13 is a block diagram showing an example of the coordinate system determination part 533. The coordinate system determination part 533 of this example has a resolution reduction part 551, a low-resolution image storage part 552, a key point and scale detection part 553, an orientation detection part 554, and a statistical processing part 555.

The resolution reduction part 551 has a function to reduce the resolution of an image of the layer 511 stored in the image storage part 532 by a predetermined standard and store the image into the low-resolution image storage part 552. In a case where the particles 512 are ununiformly contained by the layer 511 and a reflection characteristic of the particles 512 is different from that of another material, when the resolution of an image of the layer 511 is reduced, a grayscale pattern corresponding to the density of the particles 512 appears. The resolution reduction part 551 is a unit to generate a grayscale pattern corresponding to the density of the particles 512 on the basis of an image of the layer 511.

The key point and scale detection part 553 has a function to detect a key point and a scale from an image having a grayscale pattern stored in the low-resolution image storage part 552. A key point is a point or a region which characteristically appears on an image even if a scale changes, and a scale to be detected is an optimum scale which is the most robust to a scale change. Detection of a key point and a scale by the key point and scale detection part 553 is equivalent to detection of a key point and a scale performed in the course of generation of a SIFT (Scale-Invariant Feature Transform) descriptor. In general, SIFT is unsuitable for an image in which the fine particles 512 are scattered, but it is possible to stably extract a key point and a scale from a grayscale pattern generated by reducing resolution as described above.

The orientation detection part 554 has a function to determine an "orientation" which, for every key point detected by the key point and scale detection part 553, characterizes the key point. Detection of an orientation by the orientation detection part 554 is equivalent to detection of an orientation executed in the course of generation of a SIFT descriptor.

The statistical processing part 555 has a function to determine the origin, axis and scale of a unique coordinate system on the basis of a key point and a scale detected by the key point and scale detection part 553 and an orientation of each key point detected by the orientation detection part 554. For example, the statistical processing part 555 determines the origin of a unique coordinate system on the basis of the distribution of a plurality of key points. To be specific, the statistical processing part 555 sets the center of gravity of the detected key points as the origin of the unique coordinate system. Moreover, the statistical processing part 555 determines a scale and an axis of the unique coordinate system on the basis of the distributions of scales and orientations of the key points. To be specific, the statistical processing part 555 sets the scale of the key points and the center of the distribution of the orientations as the scale and axis of the unique coordinate system. That is to say, the statistical processing part 555 sets the center of the distribution of the scales of the key points as the scale of the unique coordinate system, and sets the center of the distribution of the orientations of the key points as an axis of the unique coordinate system. As the center of distribution, for example, the mode may be used. However, the center of distribution is not limited to the mode and may be the average or the median.

Figure 14:
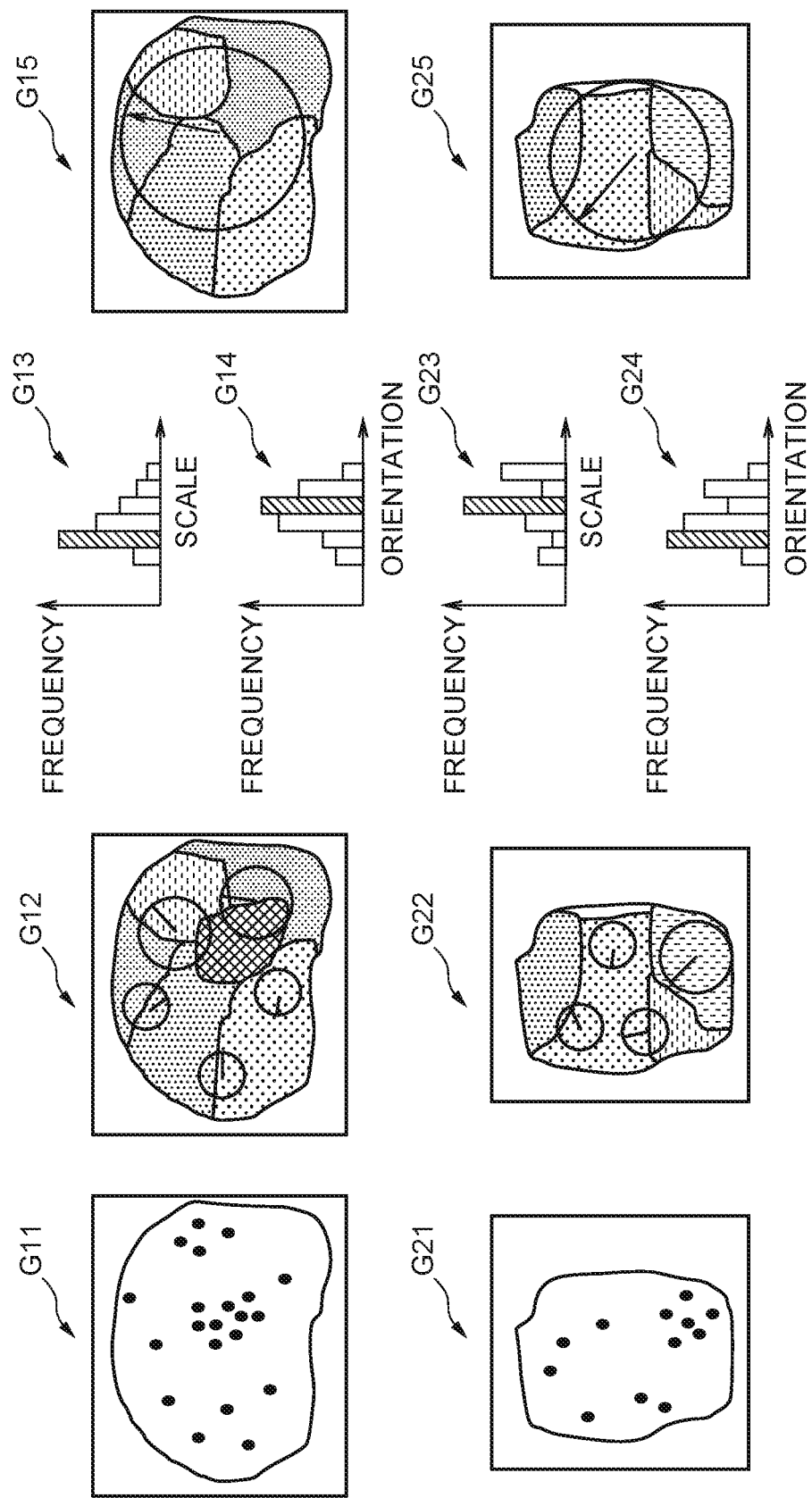
FIG. 14 is an operation description diagram of the coordinate system determination part in the individual identifier extraction device according to the fifth exemplary embodiment of the present invention.

FIG. 14 is a schematic diagram for describing an operation of the coordinate system determination part 533 described with reference to FIG. 13. In FIG. 14, reference numeral G11 denotes an image of the layer 511 stored in the image storage part 532. The resolution reduction part 551 generates an image having a grayscale pattern dependent on the density of the particles 512 in the layer 511, such as an image denoted by reference numeral G12, on the basis of the image G11. In FIG. 14, for convenience, a difference in grayscale is represented by a difference in hatching type. Next, the key point and scale detection part 553 detects a key point and a scale from the image G12. A circle drawn on the image G12 is a scale, and the center of the circle is a key point. Next, the orientation detection part 554 detects an orientation for each key point. A line segment in the circle drawn on the image G12 represents an orientation.

Next, in order to determine the scale and axis of a unique coordinate system on the basis of the distribution of scales and orientations of the detected key points, the statistical processing part 555 generates a histogram such as a histogram G13 that the horizontal axis takes scale and the vertical axis takes frequency, and a histogram such as a histogram G14 that the horizontal axis takes orientation and the vertical axis takes frequency. Next, the statistical processing part 555 obtains a scale of the mode from the histogram G13 and sets this scale as a scale of a unique coordinate system. Moreover, the statistical processing part 555 obtains an orientation of the mode from the histogram G14, and sets this orientation as a direction of an axis of the unique coordinate system. Furthermore, the statistical processing part 555 obtains the center of gravity of the detected key points, and sets it as the origin of the unique coordinate system. In FIG. 14, a circle drawn in an image G15 represents a scale of a unique coordinate system, the center of the circle represents the origin of the unique coordinate system, and an arrow in the circle represents the direction of an axis of the unique coordinate system.

In FIG. 14, another image G21 in which the planar shape of the layer and the distribution of the particles in the layer are different from those of the image G11, a low-resolution image G22 generated on the basis of the image G21, detected key points and scales, histograms G23 and G24, and an image G25 showing the determined unique coordinate system are illustrated. Thus, if the planar shape of the layer and the distribution of the particles in the layer vary, a unique coordinate system varies in many cases.

Figure 15:
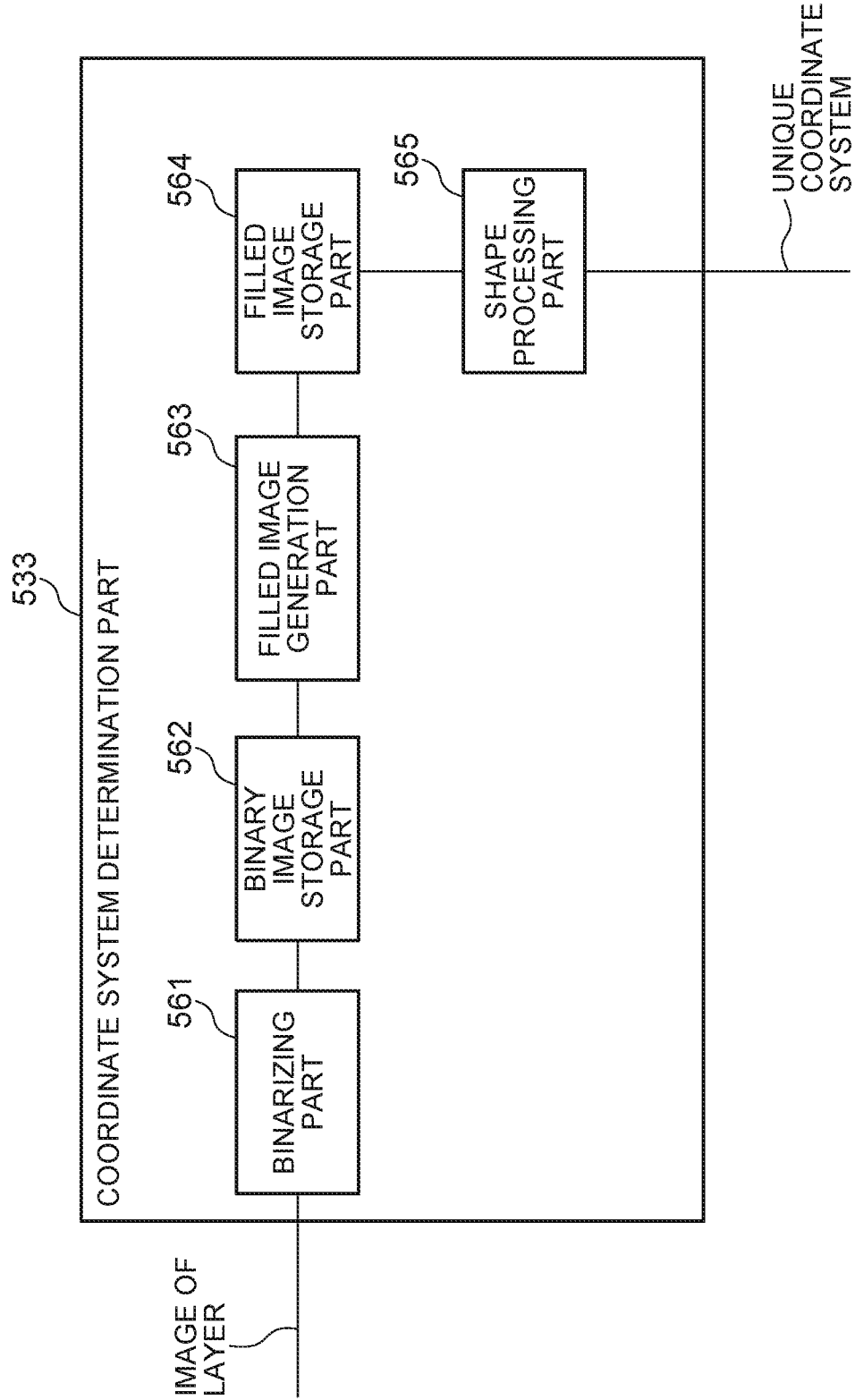
FIG. 15 is a block diagram showing another configuration example of the coordinate system determination part in the individual identifier extraction device according to the fifth exemplary embodiment of the present invention.

FIG. 15 is a block diagram showing another example of the coordinate system determination part 533. The coordinate system determination part 533 of this example has a binarizing part 561, a binary image storage part 562, a filled image generation part 563, a filled image storage part 564, and a shape processing part 565.

The binarizing part 561 has a function to binarize an image of the layer 511 stored in the image storage part 532 and store the image into the binary image storage part 562. Consequently, a binary image is obtained in which most of the pixels of a background region are white pixels (value 0) and a region of the layer 511 includes white pixels (value 0) and black pixels (value 1) in accordance with the distribution of the particles 512.

The filled image generation part 563 has a function to generate an image (a filled image) having an identical shape to the planar shape of the layer 511 and filled with black pixels from a binary image stored in the binary image storage part 562 and store the image into the filled image storage part 564. A method for generating a filled image from a binary image may be any method. For example, the filled image generation part 563 may generate a filled image by executing a morphological operation on a binary image stored in the binary image storage part 562. Moreover, the filled image generation part 563 may generate a filled image from a binary image by executing an n-pixel dilation process and an n-pixel erosion process where a predetermined pixel length is n. An n-pixel dilation process is a process to, in a case where the value of a target pixel is 1, perform an operation to change the values of all the pixels within an n-pixel length from the target pixel to 1 on all the pixels of a binary image. An n-pixel erosion process is a process to, in a case where the value of a target pixel is 0, perform an operation to change the values of all the pixels within an n-pixel length from the target pixel to 0 on the binary image after the n-pixel dilation process.

The shape processing part 565 has a function to determine a unique coordinate system on the basis of a characteristic of a filled image stored in the filled image storage part 564. For example, the shape processing part 565 determines the center of gravity of a filled image as the origin of a unique coordinate system. Moreover, the shape processing part 565 determines, as an axis of the unique coordinate system, an axis passing the center of gravity, being parallel to an image plane and satisfying that an axial second moment is the minimum or the maximum. Moreover, the shape processing part 565 determines the area of the filled image as a scale of the unique coordinate system.

Figure 16:
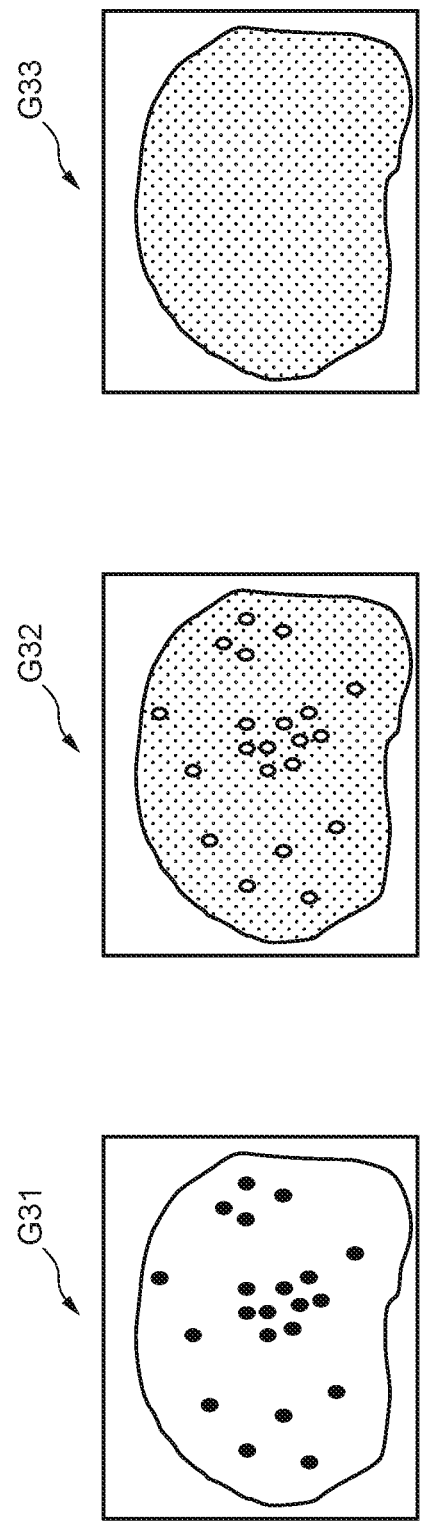
FIG. 16 is an operation description diagram of the coordinate system determination part in the individual identifier extraction device according to the fifth exemplary embodiment of the present invention.

FIG. 16 is a schematic diagram for describing an operation of the coordinate system determination part 533 described with reference to FIG. 15. In FIG. 16, reference numeral G31 denotes an image of the layer 511 stored in the image storage part 532. The binarizing part 561 generates a binary image denoted by reference numeral G32 from the image G31. In FIG. 16, for convenience, a black pixel is represented by hatching, and a white pixel is represented by a white circle. Next, the filled image generation part 563 generates an image filled with black pixels denoted by reference numeral G33 from the binary image G32. Next, the shape processing part 565 extracts the center of gravity, moment and area of the filled image G33 and sets them as the origin, axis and scale of a unique coordinate system, respectively.

Next, a specific example of the normalized image generation part 534 will be described.

The normalized image generation part 534 sets the origin of a coordinate system unique to an image of the layer 511 determined by the coordinate system determination part 533 as the origin of a normalized coordinate system. Moreover, the normalized image generation part 534 rotates the image of the layer 511 about the origin so that the axis of the unique coordinate system matches the axis of the normalized coordinate system. Furthermore, the normalized image generation part 534 enlarges or reduces the image of the layer 511 so that the scale of the unique coordinate system matches the scale of the normalized coordinate system. In other words, the normalized image generation part 534 generates a normalized image by executing coordinate transformation with the unique coordinate system as a pre-transformation coordinate system and the normalized coordinate system as a post-transformation coordinate system on the image of the layer 511.

Figure 17:
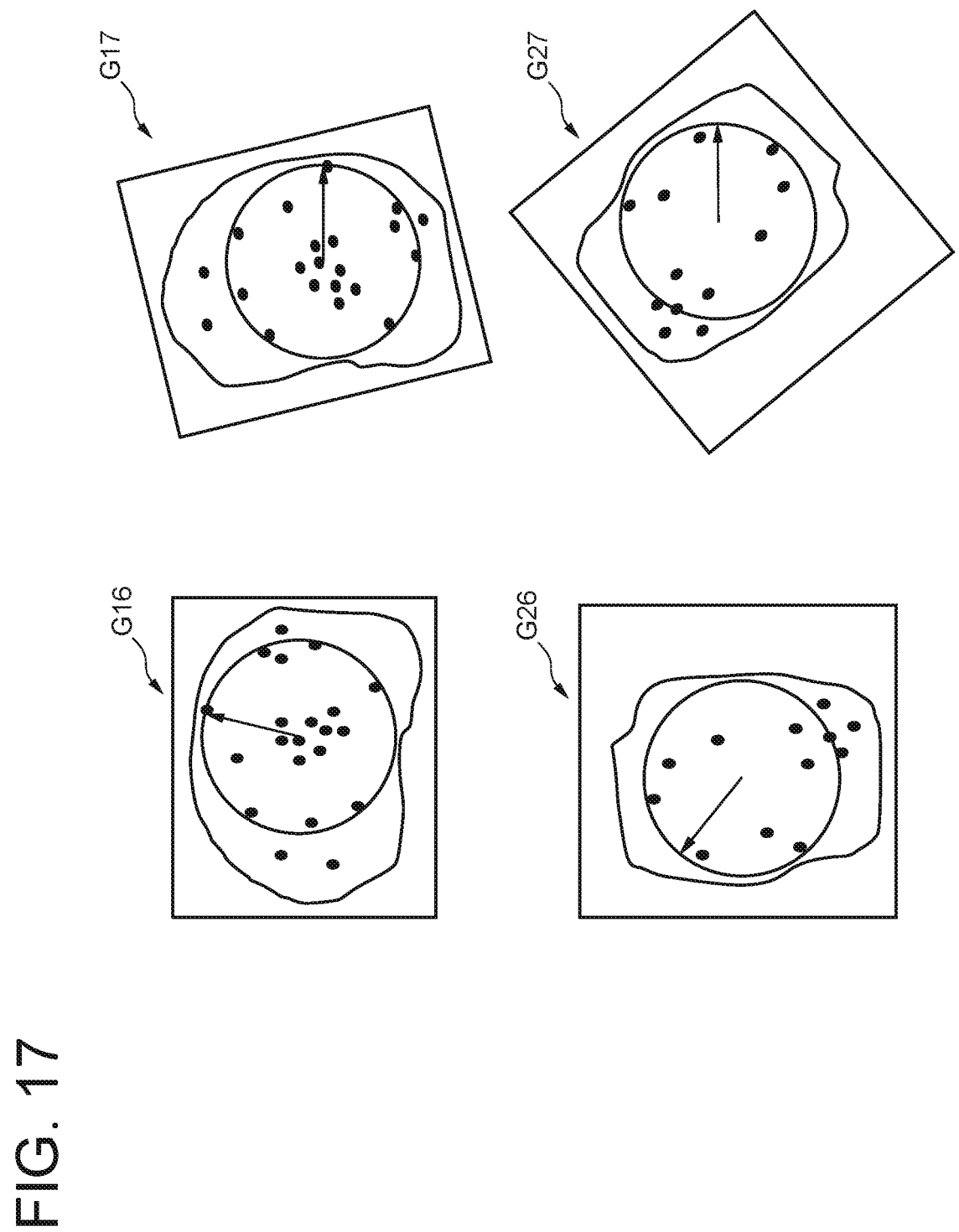
FIG. 17 is an operation description diagram of a normalized image generation part in the individual identifier extraction device according to the fifth exemplary embodiment of the present invention.

FIG. 17 is a schematic diagram for describing an operation of the normalized image generation part 534. In FIG. 17, images G16 and G26 are images representing coordinate systems unique to the images G11 and G21 shown in FIG. 14, respectively. That is, circles drawn with solid lines in the images G16 and G26 represent scales of the unique coordinate systems, the centers of the circles represent the origins of the unique coordinate systems, and arrows in the circles represent the axes of the unique coordinate systems, respectively.

The normalized image generation part 534 generates normalized images by rotating and also enlarging or reducing the images G16 and G26 about the origins so that the axes of the unique coordinate systems match the axes of normalized coordinate systems and the scales of the unique coordinate systems match the scales of the normalized coordinate systems. In FIG. 17, reference numerals G17 and G27 denote normalized images of the images G16 and G26 thus generated. Circles drawn in the images G17 and G27 represent the scales of the normalized coordinate systems, and arrows in the circles represent the axes of the normalized coordinate systems.

Next, a specific example of the fixed region determination part 536 will be described.

The fixed region determination part 536 defines a fixed region in a normalized image by using a normalized coordinate system. For example, the fixed region determination part 536 defines, as a fixed region, a square whose center of gravity is the origin of a normalized coordinate system and whose size of a side is the scale of the normalized coordinate system and which has two sides parallel to the axis of the normalized coordinate system. It is needless to say that the shape of a fixed region is not limited to a square and may be another shape like a rectangle. Moreover, there is no need to make the size of a side match the scale of a normalized coordinate system and can be any fixed value.

Figure 18:
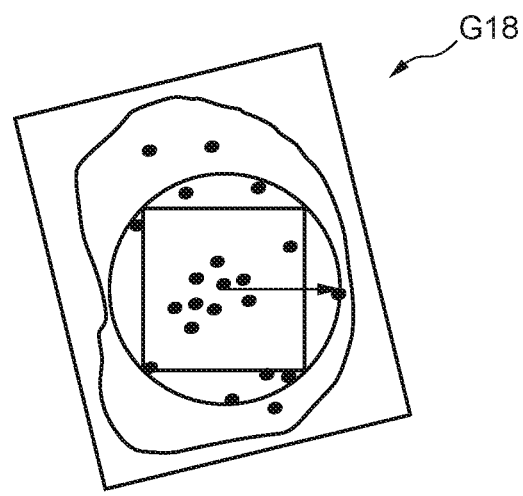
FIG. 18 is an operation description diagram of a fixed region determination part in the individual identifier extraction device according to the fifth exemplary embodiment of the present invention.
Figure 18:
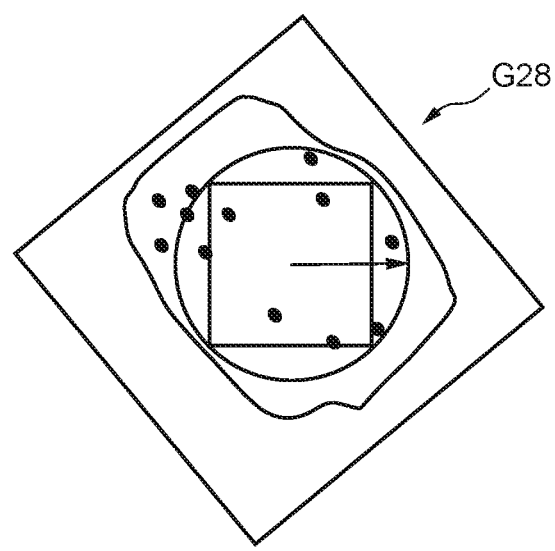

FIG. 18 is a schematic diagram for describing a fixed region defined by the fixed region determination part 536. In FIG. 18, images G18 and G28 are examples of images obtained by adding feature quantity extraction regions to the images G17 and G27 shown in FIG. 17. That is, circles drawn in the images G18 and G28 represent the scales of normalized coordinate systems, the centers of the circles represent the origins of the normalized coordinate systems, and arrows in the circles represent the axes of the normalized coordinate systems, respectively. Then, squares drawn with solid lines in the images G18 and G28 are fixed region to become regions from which feature quantities are extracted.

Next, a specific example of the feature quantity extraction part 537 will be described.

The feature quantity extraction part 537 has a function to extract and output, as the individual identifier 520 of the object 510, a feature quantity dependent on the distribution of the particles 512 in the feature quantity extraction region in the normalized image of the layer 511 stored in the normalized image storage part 535.

A feature quantity extracted by the feature quantity extraction part 537 is, for example, a vector of a fixed number of dimensions as shown below.

Feature Quantity Example 1

The feature quantity extraction part 537 equally divides a feature quantity extraction region in a normalized image of the layer 511 into n in a direction parallel to an axis of a normalized coordinate system and then dividing into m in a direction perpendicular to the axis, thereby dividing the feature quantity extraction region into n×m blocks. Next, the feature quantity extraction part 537 extracts the luminance of each of the blocks. Next, the feature quantity extraction part 537 compares the luminance of each of the blocks with a threshold and, for example, determines the luminance as a value 1 if the luminance is equal to or more than the threshold and determines the luminance as a value 0 otherwise, thereby quantizing the luminance of the respective blocks to two values. Then, the feature quantity extraction part 537 outputs a bit string of quantized values of the respective blocks arranged in a predetermined order as an n×m dimensional feature quantity forming an individual identifier.

Feature Quantity Example 2

The feature quantity extraction part 537 extracts a fixed bit length of BRIEF (Binary Robust Independent Elementary Features) from a feature quantity extraction region in a normalized image of the layer 511, and outputs it as a feature quantity of a fixed number of dimensions forming an individual identifier.

However, a feature quantity extracted by the feature quantity extraction part 537 is not limited to the above examples. For example, the feature quantity extraction part 537 may extract a SIFT feature quantity as an individual identifier from a feature quantity extraction region in a normalized image of the layer 511. In this case, when a SIFT feature quantity is extracted directly from an image of a feature quantity extraction region, an orientation does not appear because one of the particles 512 becomes the minimum scale, and a descriptor becomes unstable. Therefore, as in an example of extraction of a feature quantity in a sixth exemplary embodiment to be described later, it is desired to generate an image having a grayscale pattern by reducing the resolution of an image in a feature quantity extraction region by a predetermined standard and extract a SIFT feature quantity from the image having the grayscale pattern. However, from the viewpoint of an identification capability and an increase of the speed of identification and verification, it is preferred to extract the feature quantity of a fixed number of dimensions described above than a SIFT feature quantity.

Sixth Exemplary Embodiment

Figure 19:
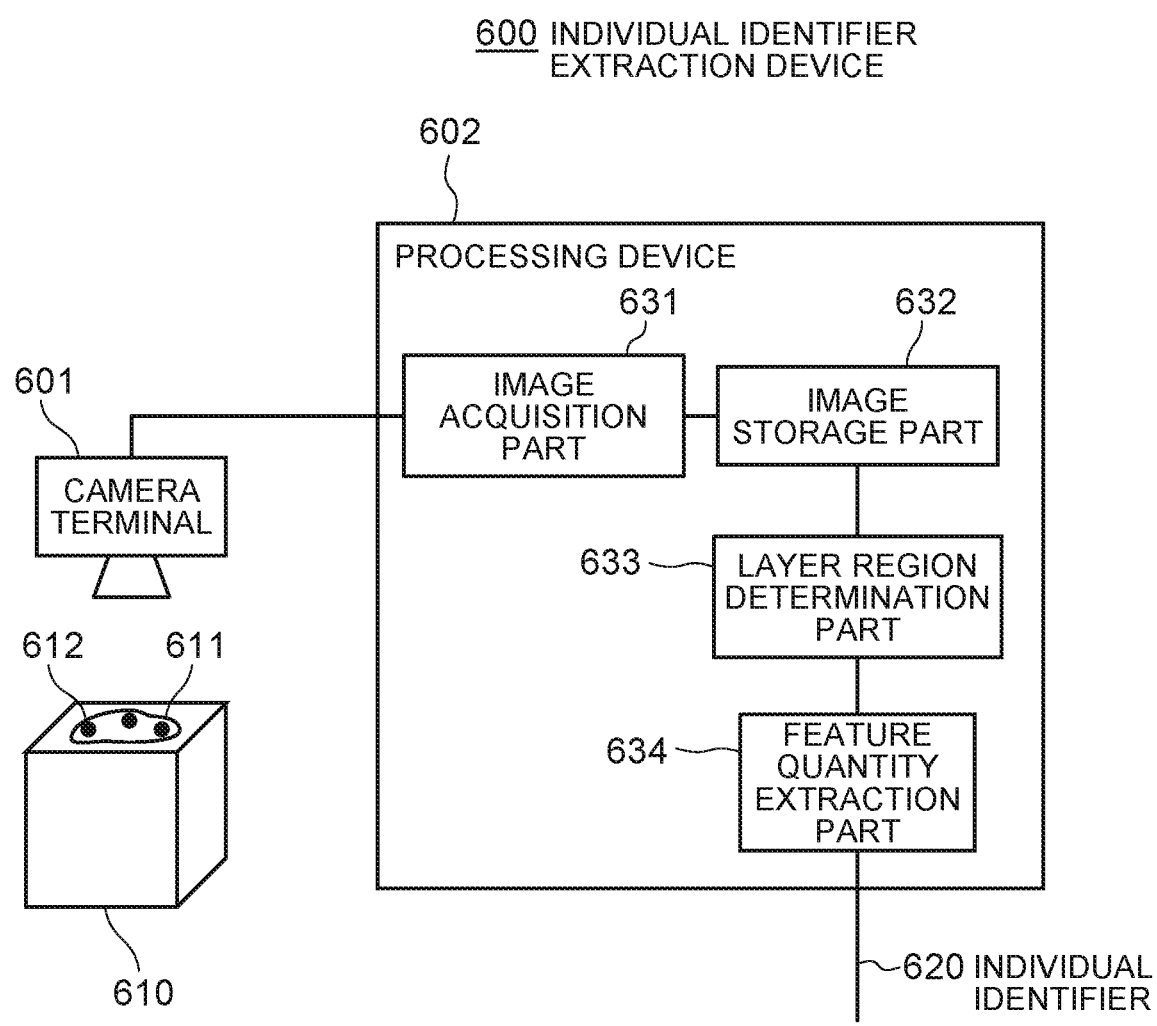
FIG. 19 is a block diagram of an individual identifier extraction device according to a sixth exemplary embodiment of the present invention.

This exemplary embodiment further embodies the individual identifier extraction device 100 according to the first exemplary embodiment of the present invention. With reference to FIG. 19, an individual identifier extraction device 600 according to a sixth exemplary embodiment of the present invention has a function to extract an individual identifier 620 of an object 610.

The object 610, a layer 611 formed on a face thereof and a fine particle 612 contained in the layer 611 are the same as the object 110, the layer 111 and the fine particle 112 described with reference to FIG. 1.

The individual identifier extraction device 600 has a camera terminal 601 and a processing device 602 connected thereto. The camera terminal 601 is the same as the camera 501 described with reference to FIG. 10.

The processing device 602 has a function to extract the individual identifier 620 from an image of the layer 611 of the object 610. The processing device 602 has, as major function parts, an image acquisition part 631, an image storage part 632, a layer region determination part 633, and a feature quantity extraction part 634. The processing device 602 is realized by, for example, as shown in FIG. 11, the information processing apparatus 540 having the arithmetic processing part 541 such as one or more microprocessors and the storage part 542 such as a memory and a hard disk used as the image storage part 632, and the program 543. The program 543 is loaded to the memory from an external computer-readable recording medium at the startup of the information processing apparatus 540 and controls an operation of the arithmetic processing part 541, thereby realizing functional units such as the image acquisition part 631, the layer region determination part 633 and the feature quantity extraction part 634 on the arithmetic processing part 541.

The image acquisition part 631 and the image storage part 632 have the same functions as the image acquisition part 531 and the image storage part 532 described with reference to FIG. 10.

The layer region determination part 633 has a function to determine the whole planar shape of the layer 611 stored in the image storage part 632 as a feature quantity extraction region.

The feature quantity extraction part 634 has a function to extract a feature quantity dependent on the distribution of the particles 612 from the feature quantity extraction region in the image of the layer 611 stored in the image storage part 632 and output the feature quantity as the individual identifier 620 of the object 610.

Figure 20:
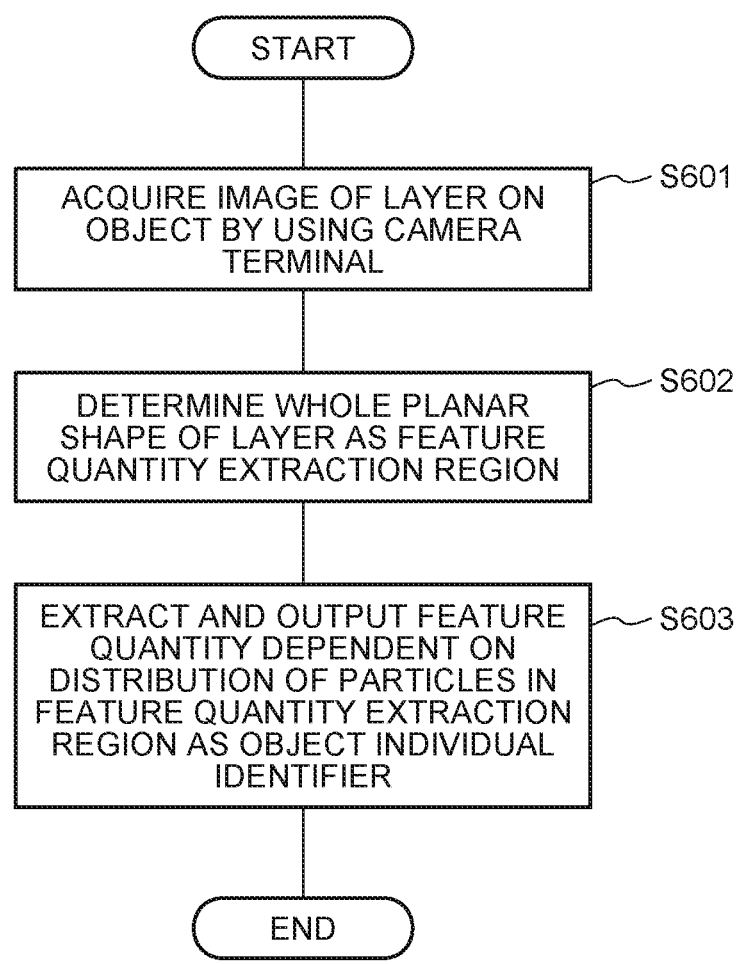
FIG. 20 is a flowchart showing an operation of a processing device of the individual identifier extraction device according to the sixth exemplary embodiment of the present invention.

FIG. 20 is a flowchart showing an operation of the processing device 602. With reference to FIGS. 19 and 20, the operation of the processing device 602 will be described below.

First, the image acquisition part 631 of the processing device 602 acquires an image of the layer 611 on the object 610 with the use of the camera terminal 601, and stores the image into the image storage part 632 (step S601).

Next, the layer region determination part 633 of the processing device 602 determines the whole planar shape of the layer 611 as a feature quantity extraction region (step S602). The layer region determination part 633 can extract the whole planar shape of the layer 611, for example, by binarizing the image of the layer 611 and executing a morphological operation on the binary image.

Next, the feature quantity extraction part 634 of the processing device 602 extracts a feature quantity dependent on the distribution of the particles 612 from the feature quantity extraction region in the image of the layer 611 stored in the image storage part 632, and outputs the feature quantity as the individual identifier 620 of the object 610 (step S603). In this exemplary embodiment, normalization of a coordinate system as in the fifth exemplary embodiment is not performed, so that the feature quantity extraction part 634 extracts a feature quantity which is robust to image rotation or the like; for example, a SIFT feature quantity. However, a feature quantity extracted by the feature quantity extraction part 634 is not limited to a SIFT feature quantity. Moreover, when a SIFT feature quantity is directly extracted from an image, one of the particles 612 becomes the minimum scale and an orientation does not appear, so that a descriptor becomes unstable, an inlier ratio becomes small, and matching becomes difficult. Thus, in this exemplary embodiment, extract a SIFT feature quantity in the following manner.

The feature quantity extraction part 634 firstly reduces the resolution of the image of the feature extraction region of the layer 611 by a predetermined standard. Thus, an image having a grayscale pattern dependent on the density of the particles 612 in the layer 611 is generated. Next, the feature quantity extraction part 634 extracts a SIFT feature quantity from the image having the grayscale pattern.

Seventh Exemplary Embodiment

Figure 21:
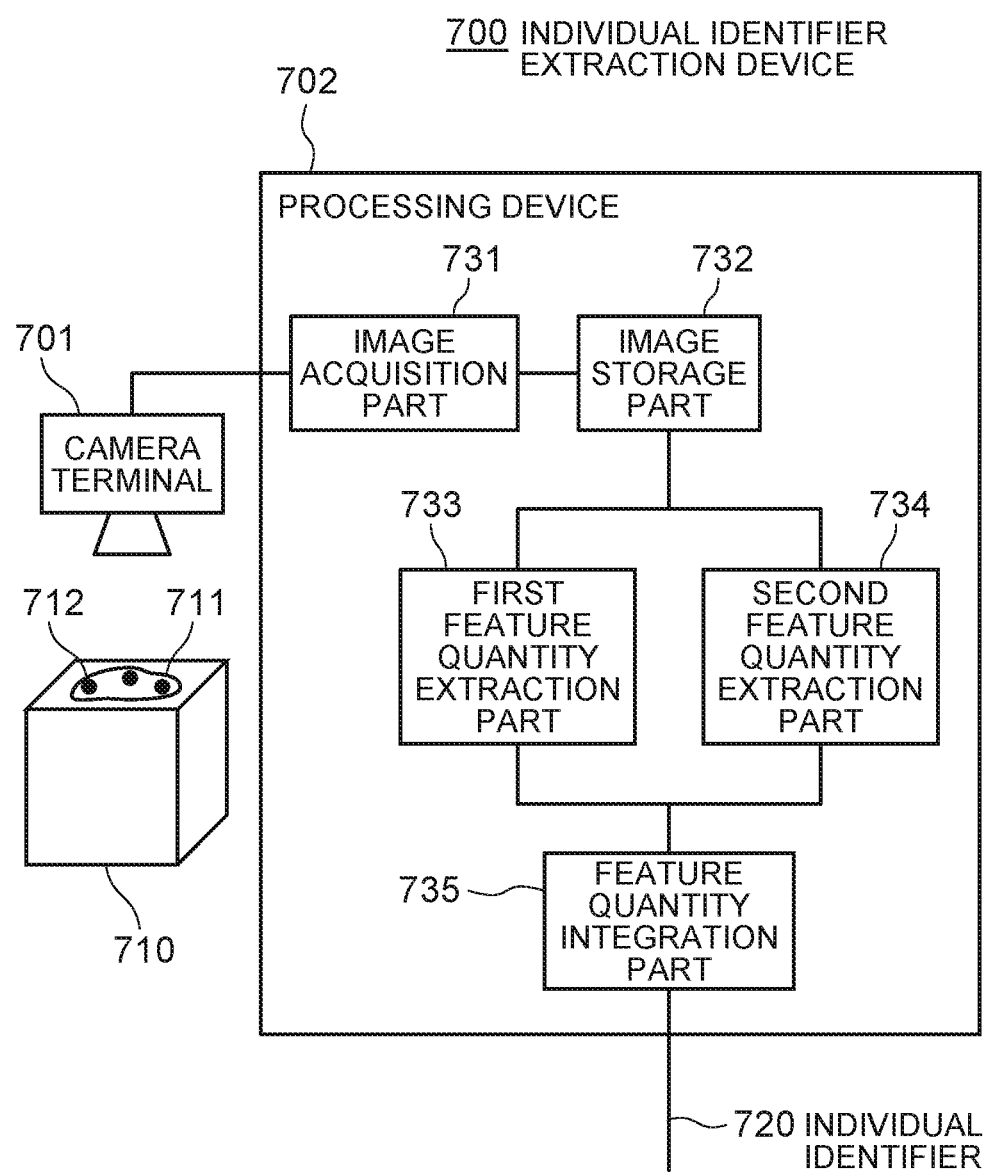
FIG. 21 is a block diagram of an individual identifier extraction device according to a seventh exemplary embodiment of the present invention.

This exemplary embodiment further embodies the individual identifier extraction device 100 according to the first exemplary embodiment of the present invention. With reference to FIG. 21, an individual identifier extraction device 700 according to a seventh exemplary embodiment of the present invention has a function to extract an individual identifier 720 of an object 710.

The object 710, a layer 711 formed on a face thereof and a fine particle 712 contained by the layer 711 are the same as the object 110, the layer 111 and the fine particle 112 described with reference to FIG. 1.

The individual identifier extraction device 700 has a camera terminal 701 and a processing device 702 connected thereto. The camera terminal 701 is the same as the camera terminal 501 described with reference to FIG. 10.

The processing device 702 has a function to extract the individual identifier 720 from an image of the layer 711 of the object 710. The processing device 702 has, as major function parts, an image acquisition part 731, an image storage part 732, a first feature quantity extraction part 733, a second feature quantity extraction part 734, and a feature quantity integration part 735. The processing device 702 is realized by, for example, as shown in FIG. 11, the information processing apparatus 540 having the arithmetic processing part 541 such as one or more microprocessors and the storage part 542 such as a memory and a hard disk used as the image storage part 732, and the program 543. The program 543 is loaded to the memory from an external computer-readable recording medium at the startup of the information processing apparatus 540 and controls an operation of the arithmetic processing part 541, thereby realizing functional units such as the image acquisition part 731, the first feature quantity extraction part 733, the second feature quantity extraction part 734 and the feature quantity integration part 735 on the arithmetic processing part 541.

The image acquisition part 731 and the image storage part 732 have the same functions as the image acquisition part 531 and the image storage part 532 described with reference to FIG. 10.

The first feature quantity extraction part 733 has a function to extract a feature quantity dependent on the planar shape of the layer 711 and the distribution of the particles 712 as a first feature quantity from the image of the layer 711. The first feature quantity extraction part 733 can be realized by, for example, the coordinate system determination part 533, the normalized image generation part 534, the normalized image storage part 535, the fixed region determination part 536, and the feature quantity extraction part 537 that are described with reference to FIG. 10. Otherwise, the first feature quantity extraction part 733 can be realized by, for example, the layer region determination part 633 and the feature quantity extraction part 634 described with reference to FIG. 19.

The second feature quantity extraction part 734 has a function to extract a feature quantity dependent on the planar shape of the layer 711 as a second feature quantity from the image of the layer 711. For example, the second feature quantity extraction part 734 has a function to extract a feature quantity which is dependent on the planar shape of the layer 711 and is not dependent on the distribution of the particles 712 as a second feature quantity from the image of the layer 711. As a feature quantity extracted by the second feature quantity extraction part 734, for example, it is possible to use the minimum or maximum second moment calculated in the course of determination of the axis of a unique coordinate system by the coordinate system determination part 533 described with reference to FIG. 15. However, a feature quantity extracted by the second feature quantity extraction part 734 is not limited to the above one, and another feature quantity such as the area and the perimeter of the planar shape of the layer 711 may be used.

The feature quantity integration part 735 has a function to generate the individual identifier 720 of the object 710 on the basis of the first feature quantity extracted by the first feature quantity extraction part 733 and the second feature quantity extracted by the second feature quantity extraction part 734. For example, the feature quantity extraction part 735 connects the first feature quantity with the second feature quantity to generate the individual identifier 720.

Figure 22:
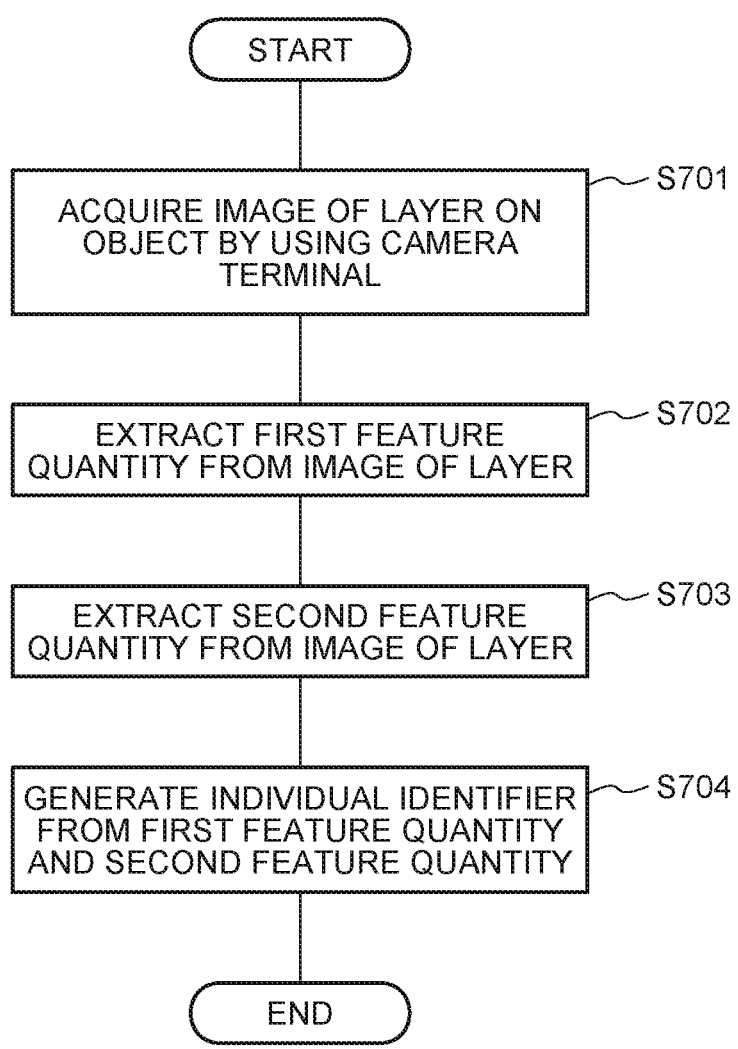
FIG. 22 is a flowchart showing an operation of a processing device of the individual identifier extraction device according to the seventh exemplary embodiment of the present invention.

FIG. 22 is a flowchart showing an operation of the processing device 702. With reference to FIGS. 21 and 22, the operation of the processing device 702 will be described below.

First, the image acquisition part 731 of the processing device 702 acquires an image of the layer 711 on the object 701 by using the camera terminal 701, and stores the image into the image storage part 732 (step S701).

Next, the first feature quantity extraction part 733 of the processing device 702 extracts a first feature quantity dependent on the planar shape of the layer 711 and the distribution of the particles 712 from the image of the layer 711 (step S702).

Next, the second feature quantity extraction part 734 of the processing device 702 extracts a second feature quantity dependent on the planar shape of the layer 711 from the image of the layer 711 (step S703).

Next, the feature quantity integration part 735 of the processing device 702 generates and outputs the individual identifier 720 of the object 710 by integrating the first feature quantity and the second feature quantity (step S704)

Thus, according to this exemplary embodiment, the individual identifier 720 of the object 710 includes the first feature quantity and the second feature quantity. Therefore, in verification and identification with the use of the individual identifier 720 extracted in this exemplary embodiment, comparison of individual identifiers with each other can be performed in one of the following three patterns or in combination of two or all of the patterns; comparison of the first feature quantities with each other, comparison of the second feature quantities with each other, and comparison of the individual identifiers respectively including the first feature quantities and the second feature quantities with each other. Therefore, for example, the following mode becomes possible; firstly compare the second feature quantities with each other, exclude candidates which are not identical or similar to each other, compare the first feature quantities of the remaining candidates, and finally perform identification and verification.

Eighth Exemplary Embodiment

Figure 23:
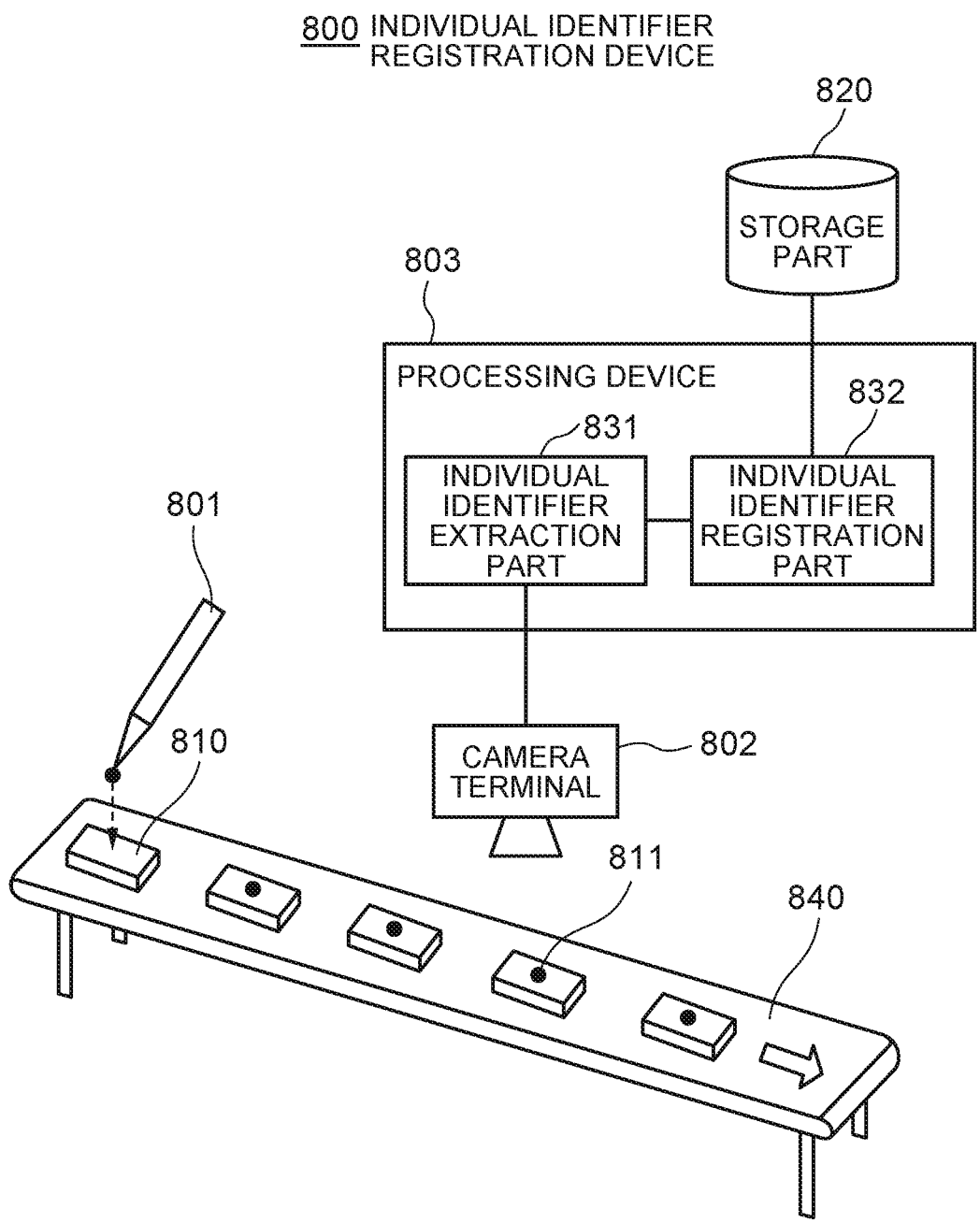
FIG. 23 is a diagram showing a configuration of an individual identifier registration device according to an eighth exemplary embodiment of the present invention.

This exemplary embodiment further embodies the individual identifier registration device 200 according to the second exemplary embodiment of the present invention. With reference to FIG. 23, an individual identifier registration device 800 according to an eighth exemplary embodiment of the present invention has a function to provide an individual identifier for product traceability to a product 810.

The product 810 is an industrial product, a product package or the like to which an individual identifier is attached. The products 810 are conveyed continuously or intermittently in a direction of an illustrated arrow by a belt conveyor 840 installed in a production line.

The individual identifier registration device 800 includes a pen 801, a camera terminal 802, and a processing device 803.

The pen 801 is a pen using ink containing fine particles. As the fine particles, the same particles as the fine particles 112 described with reference to FIG. 1 can be used. As the pen 801, for example, a commercially available pen called a lame pen, a glitter pen or a glitter fluorescent marker can be used. It is needless to say that a pen designated for the present invention may be used or a commercially available pen whose ink is replaced with ink containing the fine particles may be used. In this exemplary embodiment, an operator of the factory line manually writes a dot whose maximum width is about 1 mm on the product 810 with the use of the pen 801. However, the size of the dot is not limited to the above one and the dot may have any size. Thus, a dot 811 containing fine particles at random positions and having an irregular planar shape is formed on the product 810. The dot 811 is equivalent to the layer 211 in the second exemplary embodiment.

The camera terminal 802 is the same as the camera terminal 501 described with reference to FIG. 10.

The processing device 803 has an individual identifier extraction part 831 and an individual identifier registration part 832.

The individual identifier extraction part 831 has a function to acquire an image of the dot 811 formed on the product 810 with the use of the camera 802 and extract a feature quantity dependent on the planar shape of the dot 811 and the distribution of the particles in the dot 811 as an individual identifier of the product 810 from the image. The individual identifier extraction part 831 can be realized by, for example, the processing device 502 described with reference to FIG. 10. Otherwise, the individual identifier extraction part 831 can be realized by, for example, the processing device 602 described with reference to FIG. 19. Otherwise, the individual identifier extraction part 831 can be realized by, for example, the processing device 702 described with reference to FIG. 21.

The individual identifier registration part 832 has a function to register an individual identifier of the product 810 extracted by the individual identifier extraction part 831 as a registered product individual identifier into the storage part 820. The individual identifier registration part 832 is realized by, for example, the individual identifier registration part 203 described with reference to FIG. 3.

Figure 24:
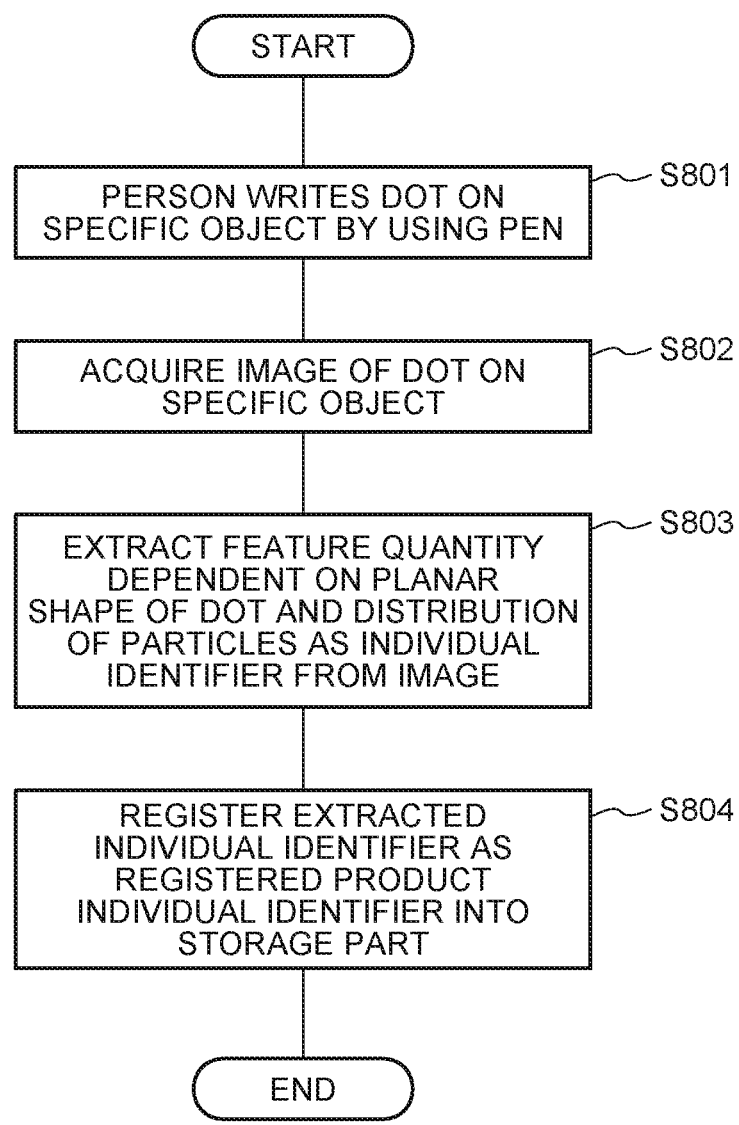
FIG. 24 is a flowchart showing a procedure of an operation of the individual identifier registration device according to the eighth exemplary embodiment of the present invention.

FIG. 24 is a flowchart showing a procedure of an individual identifier registration method executed by using the individual identifier registration device 800. With reference to FIGS. 23 and 24, the individual identifier registration method according to this exemplary embodiment will be described below.

First, the operator manually writes the dot 811 on the product 801 coming down on the belt conveyor 840 with the use of the pen 801 (step S801).

Next, the individual identifier extraction part 831 of the processing device 803 acquires an image of the dot 811 formed on the product 810 with the use of the camera terminal 802 (step S802). Then, the individual identifier extraction part 831 extracts a feature quantity dependent on the planar shape of the dot 811 and the distribution of the particles contained by the dot 811 as an individual identifier of the product 810 from the acquired image of the dot 811 (step S803).

Next, the individual identifier registration part 832 of the processing device 803 associates the extracted individual identifier of the product 810 with an attribute value of the product and registers into the storage part 820 (step S804).

The process described above is repeatedly executed on each product 810 coming down on the belt conveyor 840.

Thus, according to this exemplary embodiment, it is possible to obtain the same effect as in the second exemplary embodiment, and it is also possible to attach an individual identifier to a component (an object) manually assembled by a product assembly company with the use of the pen 801 and the camera terminal 802 without using a special attachment device. On the contrary, according to the techniques described in Patent Documents 1 to 3 that need to form a taggant layer in a specific region of a component, it is difficult to manually attach an individual identifier.

Further, use of the pen 801 results in decrease of the size of the dot 811 generated on the product 810. Therefore, it is possible to attach an individual identifier to a small component (object) which has no space to print a barcode or the like.

Ninth Exemplary Embodiment

Figure 25:
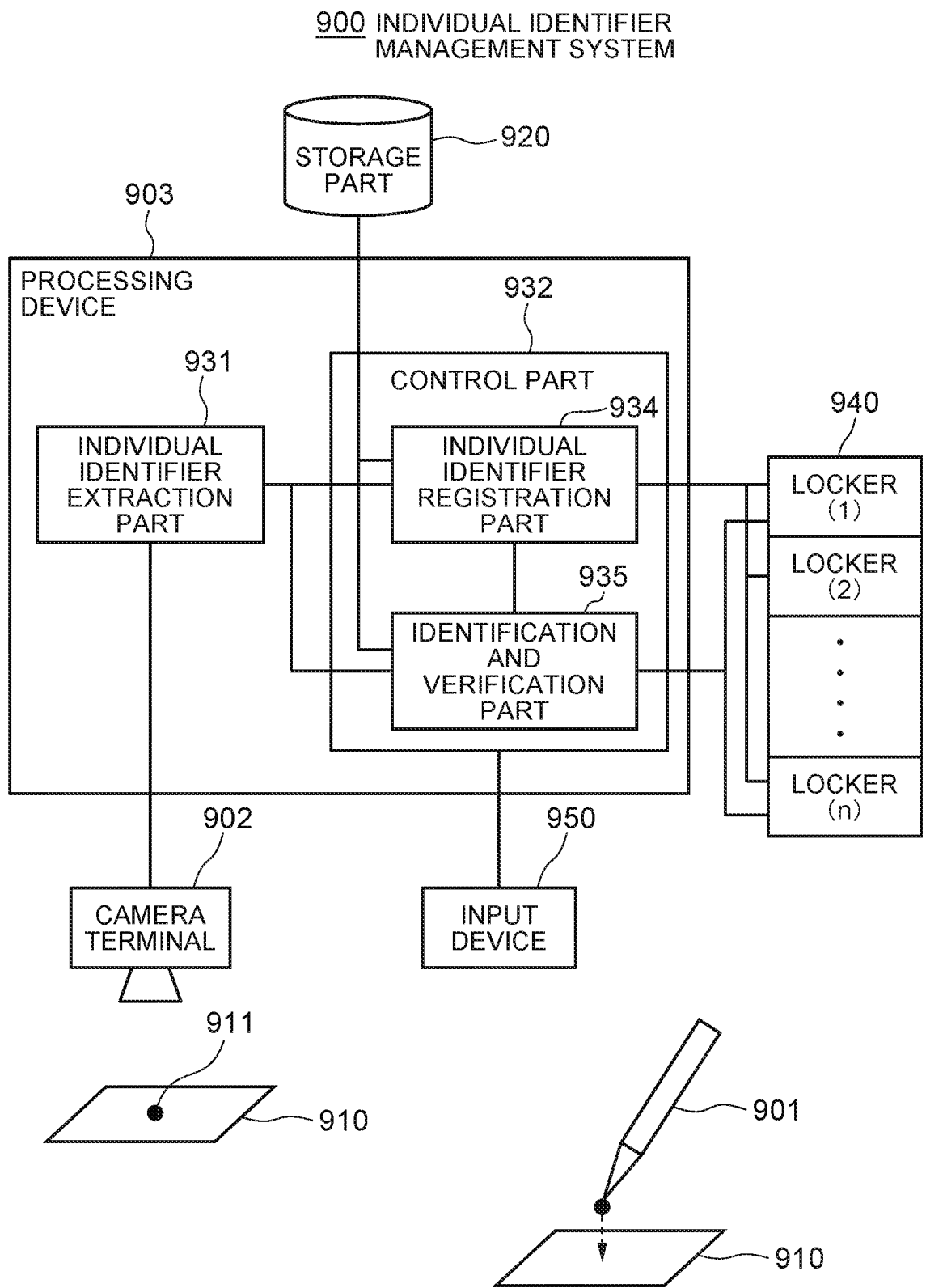
FIG. 25 is a diagram showing a configuration of an individual identifier management device according to a ninth exemplary embodiment of the present invention.

This exemplary embodiment further embodies the individual identifier management system according to the fourth exemplary embodiment of the present invention. With reference to FIG. 25, an individual identifier management system 900 according to a ninth exemplary embodiment of the present invention has a function to manage an individual identifier as a locker key.

The individual identifier management system 900 includes a pen 901, a camera terminal 902, and a processing device 903.

The pen 901 is the same as the pen 801 described with reference to FIG. 23. In this exemplary embodiment, a person who uses a locker manually writes a dot with the use of the pen 901 on the person's belongings (a name card, a notebook, and so on) or part of the person's body (for example, a finger), which will be referred to as a specific object hereinafter. Thus, a dot 911 containing fine particles at random positions and having an irregular planar shape is formed on a specific object 910. The dot 911 is equivalent to the layer 411 in the fourth exemplary embodiment.

The camera terminal 902 is the same as the camera terminal 501 described with reference to FIG. 10.

The processing device 903 has an individual identifier extraction part 931 and a control part 932. The individual identifier extraction part 931 has the same function as the individual identifier extraction part 831 described with reference to FIG. 23.

The control part 932 has a function to control so as to lock and unlock a locker 940. As the locker 940, there are n lockers with locker numbers 1 to n. The control part 932 grasps the status of use of each locker 940. When a locker number is input by a person through an input device 950, the control part 932 executes a process in accordance with the status of use of the locker 940 with the input locker number. To be specific, in a case where the locker 940 with the input locker number is unused, the control part 932 executes a process to register an individual identifier and, when finishing the registration process, opens an electronic lock of the locker 940. On the other hand, in a case where the locker with the input locker number is used, the control part 932 executes a process to verify an individual identifier and, when succeeding the verification process, opens an electronic lock of the locker 940. The locker 940 is configured to be automatically locked when the door of the locker is closed.

The control part 932 uses an individual identifier registration part 934 in the individual identifier registration process. The individual identifier registration part 934 has a function to associate the individual identifier of the specific object 910 extracted by the individual identifier extraction part 931 with the input locker number and register into a storage part 920.

Further, the control part 932 uses an identification and verification part 935 in the individual identifier verification process. The identification and verification part 935 has a function to compare the individual identifier extracted by the individual identifier extraction part 931 with an individual identifier stored in the storage part 920 so as to be associated with a locker number input by a person and verify on the basis of the comparison result.

Figure 26:
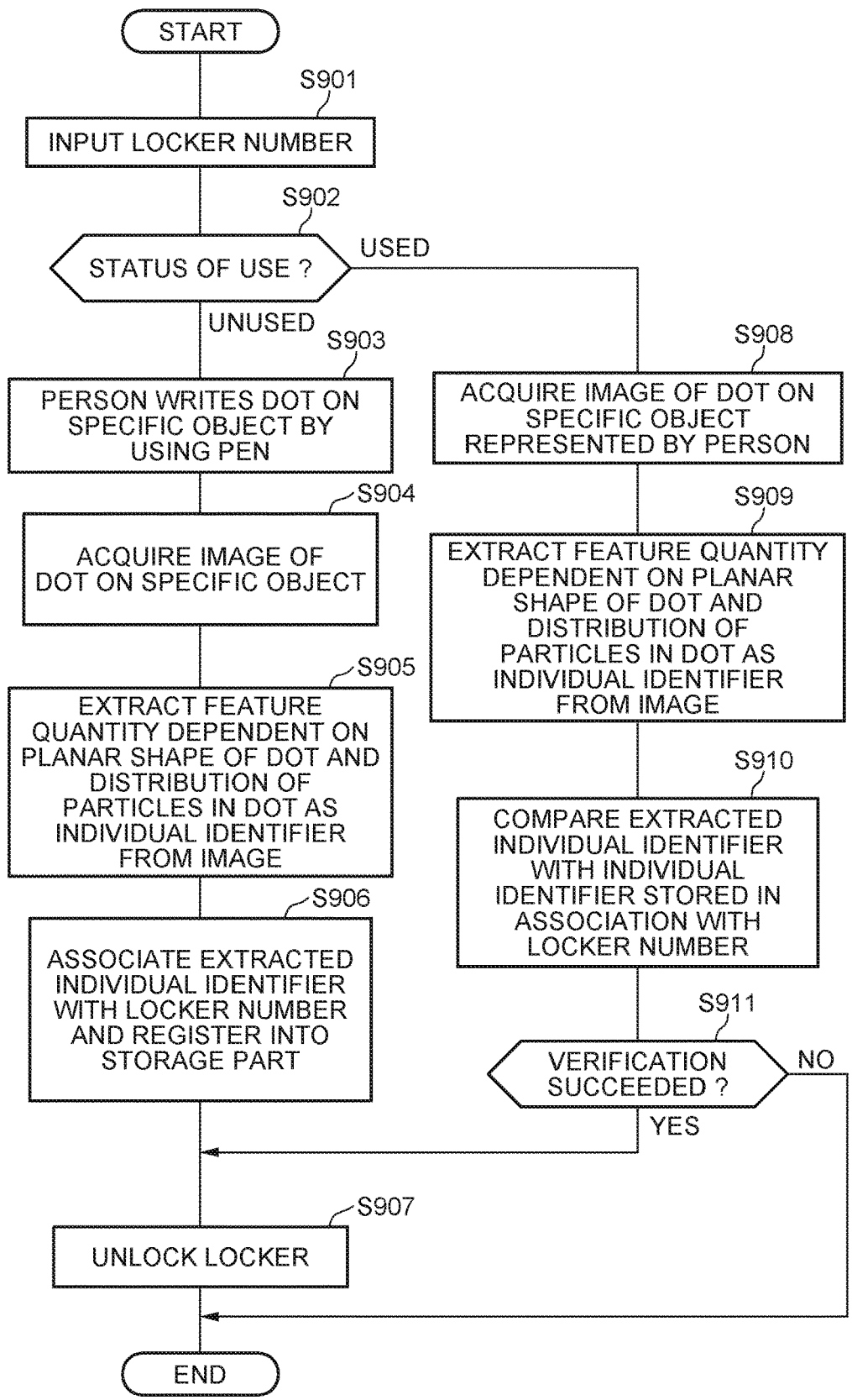
FIG. 26 is a flowchart showing a procedure of an operation of the individual identifier management device according to the ninth exemplary embodiment of the present invention.

FIG. 26 is a flowchart showing a procedure of an individual identifier management method executed by using the individual identifier management system 900. With reference to FIGS. 25 and 26, the individual identifier management method according to this exemplary embodiment will be described below.

Through an input device 950, a person who uses the locker 940 inputs a favorite locker number when using the locker first, and inputs the person's own locker number when using the locker later (step S901).

With the use of the control part 932, the processing device 903 determines whether the locker 940 with the locker number input by the person is in the unused state or in the used state (step S902). For example, the control part 932 determines the locker is used in a case where an individual identifier is stored in the storage part 920 in association with the input locker number, and determines the locker is unused otherwise.

The person using the locker 940 first manually writes a dot with the use of the pen 901 on the specific object 910 that is the person's belongings or part of the person's body (step S903). The processing device 903 acquires an image of the dot manually written with the use of the pen 901 on the specific object 910 (step S904). Next, with the use of the individual identifier extraction part 931, the processing device 903 extracts a feature quantity dependent on the planar shape of the dot and the distribution of particles in the dot as an individual identifier from the acquired image of the dot (step S905). Next, with the use of the individual identifier registration part 934 of the control part 932, the processing device 903 associates the extracted individual identifier with the input locker number and registers into the storage part 920 (step S906). Next, with the use of the control part 932, the processing device 903 opens an electronic lock of the locker 940 with the input locker number (S907). Then, the processing device 903 ends the process shown in FIG. 26. When the person puts valuables or the like in the unlocked locker 940 and shuts the door of the locker, the locker is automatically locked.

On the other hand, when determining the locker 940 with the locker number input by the person is used, the processing device 903 acquires an image of a dot manually written on the specific object 910 presented by the person with the use of the camera terminal 902 (step S908). Next, with the use of the individual identifier extraction part 931, the processing device 903 extracts a feature quantity dependent on the planar shape of the dot and the distribution of particles in the dot as an individual identifier from the acquired image of the dot (step S909). Next, with the use of the identification and verification part 935 of the control part 932, the processing device 903 compares the extracted individual identifier with an individual identifier stored in the storage part 920 so as to be associated with the input locker number (step S910). Next, with the use of the control part 932, the processing device 903 performs determination of verification of the individual identifier on the basis of the comparison result (step S911). Then, with the use of the control part 932, the processing device 903 opens the electronic lock of the locker 940 with the input locker number only when the verification succeeds (step S907).

Thus, according to this exemplary embodiment, it is possible to obtain the same effect as in the fourth exemplary embodiment and, because an individual identifier can be attached by pen, it is also possible to use the technique for personal authentication and management of personal belongings. On the contrary, according to the techniques described in Patent Documents 1 to 3 that need to form a taggant layer in a specific region of an object, it is difficult for a person to attach an individual identifier.

Tenth Exemplary Embodiment

In this exemplary embodiment, configuration examples of the pens 801 and 901 used in the eighth and ninth exemplary embodiments will be described.

Figure 27:
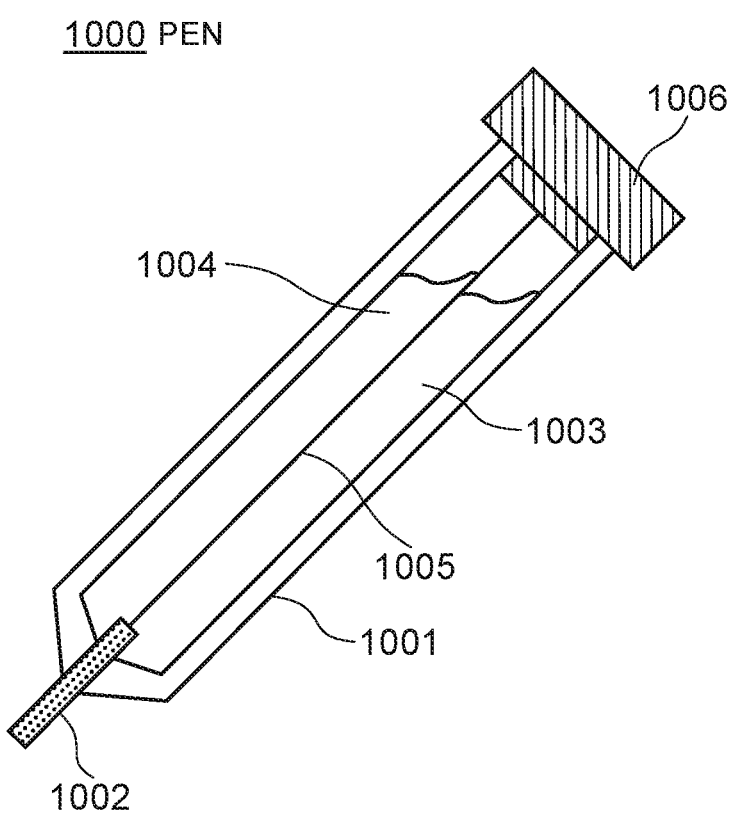
FIG. 27 is a configuration diagram of a pen according to a tenth exemplary embodiment of the present invention.

With reference to FIG. 27, a pen 1000 according to this exemplary embodiment is configured by placing a pen tip part 1002 made of a felt material in a through hole made at a head portion of a pen-like housing 1001. Moreover, the inside of the housing 1001 is divided into two chambers by a partition wall 1005, and the chambers are filled with inks 1003 and 1004, respectively.

The content densities of particles of the inks 1003 and 1004 are different from each other. For example, the density per unit volume of fine particles contained by the ink 1003 is about several times to tens of times higher than the density per unit volume of fine particles contained by the ink 1004. Moreover, the fine particles of the respective inks are different in reflection characteristic from each other.

The inks 1003 and 1004 filled in the respective chambers in the housing 1001 always seep into the pen tip part 1002 due to a capillarity action, but the inks are not mixed with each other at all even at the head portion of the pen tip part 1002. As a result, when a dot is drawn with the ink seeping from the head portion of the pen tip part 1002, the distribution of the fine particles in the dot becomes uneven.

A cap 1006 attached to the rear end of the housing 1001 can be attached and detached so that the inks 1003 and 1004 can be replenished.

The pen 1000 shown in FIG. 27 is configured so that two kinds of inks containing fine particles at different content densities seep into the felt material 1002, but may be configured so that three or more kinds of inks containing fine particles at different content densities seep into the pen tip part 1002.

Although the present invention has been described above by using the exemplary embodiments, the present invention is not limited to the exemplary embodiments and can be altered and changed in various manners. The configurations and details of the present invention can be changed in various manners that can be understood by one skilled in the art within the scope of the present invention.

The present invention is based upon and claims the benefit of priority from Japanese patent application No. 2015-130912, filed on Jun. 30, 2015, the disclosure of which is incorporated herein in its entirety by reference.

INDUSTRIAL APPLICABILITY

The present invention can be used in the field of identifying and verifying the identity of an individual such as an industrial product and a commercial product.

The whole or part of the exemplary embodiments disclosed above can be described as, but not limited to, the following supplementary notes.

[Supplementary Note 1]

An individual identifier extraction device comprising:

an acquisition part configured to acquire an image of a layer, the layer being formed on an object and containing fine particles and having an irregular planar shape; and an extraction part configured to extract a feature quantity dependent on the planar shape of the layer and distribution of the particles as an individual identifier of the object from the image.

[Supplementary Note 2]

The individual identifier extraction device according to Supplementary Note 1, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 3]

The individual identifier extraction device according to Supplementary Note 2, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 4]

The individual identifier extraction device according to Supplementary Note 3, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 5]

The individual identifier extraction device according to Supplementary Note 4, wherein the filled image generation part is configured to generate the filled image by binarizing the image of the layer and thereafter executing a morphologic operation.

[Supplementary Note 6]

The individual identifier extraction device according to Supplementary Note 4 or 5, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 7]

The individual identifier extraction device according to Supplementary Note 3, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 8]

The individual identifier extraction device according to Supplementary Note 2, wherein the region determination part is configured to determine the whole planar shape of the layer as a region dependent on the planar shape of the layer.

[Supplementary Note 9]

The individual identifier extraction device according to Supplementary Note 1, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 10]

The individual identifier extraction device according to any of Supplementary Notes 1 to 9, wherein the fine particles are different in reflection characteristic from a material of the layer excluding the fine particles.

[Supplementary Note 11]

The individual identifier extraction device according to any of Supplementary Notes 1 to 10, wherein the fine particles are ununiformly contained by the layer.

[Supplementary Note 12]

An identification device performing identification by using an individual identifier extracted by the individual identifier extraction device according to any of Supplementary Notes 1 to 9.

[Supplementary Note 13]

A verification device performing verification by using an individual identifier extracted by the individual identifier extraction device according to any of Supplementary Notes 1 to 9.

[Supplementary Note 14]

An individual identifier extraction method comprising:

acquiring an image of a layer, the layer being formed on an object and containing fine particles and having an irregular planar shape; and extracting a feature quantity dependent on the planar shape of the layer and distribution of the particles as an individual identifier of the object from the image.

[Supplementary Note 15]

The individual identifier extraction method according to Supplementary Note 14, wherein in the extraction:

a region dependent on the planar shape of the layer is determined based on the image; and a feature quantity dependent on distribution of the particles in the region of the layer is extracted as an individual identifier of the object.

[Supplementary Note 16]

The individual identifier extraction method according to Supplementary Note 15, wherein in the region determination:

a coordinate system unique to the layer is determined based on the whole image of the layer;

a normalized image of the layer is generated from the image of the layer on a basis of the unique coordinate system and a predetermined normalized coordinate system; and a predetermined region in the normalized image of the layer is determined as a region dependent on the planar shape of the layer.

[Supplementary Note 17]

The individual identifier extraction method according to Supplementary Note 16, wherein in the coordinate system determination:

a filled image having a planar shape matching the planar shape of the layer is generated; and the unique coordinate system is determined based on a characteristic of the filled image.

[Supplementary Note 18]

The individual identifier extraction method according to Supplementary Note 17, wherein in the filled image generation, the image of the layer is binarized and thereafter a morphologic operation is executed.

[Supplementary Note 19]

The individual identifier extraction method according to Supplementary Note 17 or 18, wherein in the unique coordinate system determination, a center of gravity of the filled image is set as an origin of the unique coordinate system, an axis passing the center of gravity and being parallel to a plane of the image and satisfying that an axial second moment being minimum or maximum is set as an axis of the unique coordinate system, and an area of the filled image is set as a scale of the unique coordinate system.

[Supplementary Note 20]

The individual identifier extraction method according to Supplementary Note 16, wherein in the coordinate system determination:

a low-resolution image obtained by reducing resolution of the image of the layer is generated;

a plurality of key points and scales are detected from the low-resolution image;

orientations of the plurality of key points are detected; and an origin of the unique coordinate system is determined based on positions of the plurality of key points, and a scale and an axis of the unique coordinate system are determined based on statistical values of the scales and the orientations of the plurality of key points.

[Supplementary Note 21]

The individual identifier extraction method according to Supplementary Note 15, wherein in the region determination, the whole planar shape of the layer is determined as a region dependent on the planar shape of the layer.

[Supplementary Note 22]

The individual identifier extraction method according to Supplementary Note 14, wherein in the extraction, the feature quantity is extracted as a first feature quantity from the image, a feature quantity dependent on the planar shape of the layer is extracted as a second feature quantity, and the first feature quantity is integrated with the second feature quantity, whereby an individual identifier of the object is generated.

[Supplementary Note 23]

The individual identifier extraction method according to any of Supplementary Notes 14 to 22, wherein the fine particles are different in reflection characteristic from a material of the layer excluding the fine particles.

[Supplementary Note 24]

The individual identifier extraction method according to any of Supplementary Notes 14 to 23, wherein the fine particles are ununiformly contained by the layer.

[Supplementary Note 25]

An identification method performing identification by using an individual identifier extracted by the individual identifier extraction method according to any of Supplementary Notes 14 to 22.

[Supplementary Note 26]

A verification method performing verification by using an individual identifier extracted by the individual identifier extraction method according to any of Supplementary Notes 14 to 22.

[Supplementary Note 27]

An identification and verification device comprising:

an acquisition part configured to acquire an image of a layer, the layer being formed on an object and containing fine particles and having an irregular planar shape;

an extraction part configured to extract a feature quantity dependent on the planar shape of the layer and distribution of the particles as an individual identifier of the object from the image; and a determination part configured to compare the individual identifier extracted by the extraction part with a registered object individual identifier stored in a storage part and, on a basis of a comparison result, determine identification and verification of the object.

[Supplementary Note 28]

The identification and verification device according to Supplementary Note 27, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 29]

The identification and verification device according to Supplementary Note 28, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 30]

The identification and verification device according to Supplementary Note 29, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 31]

The identification and verification device according to Supplementary Note 30, wherein the filled image generation part is configured to generate the filled image by binarizing the image of the layer and thereafter executing a morphologic operation.

[Supplementary Note 32]

The identification and verification device according to Supplementary Note 30 or 31, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 33]

The identification and verification device according to Supplementary Note 29, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 34]

The identification and verification device according to Supplementary Note 28, wherein the region determination part is configured to determine the whole planar shape of the layer as a region dependent on the planar shape of the layer.

[Supplementary Note 35]

The identification and verification device according to Supplementary Note 27, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 36]

The identification and verification device according to any of Supplementary Notes 27 to 35, wherein the fine particles are different in reflection characteristic from a material of the layer excluding the fine particles.

[Supplementary Note 37]

The identification and verification device according to any of Supplementary Notes 27 to 36, wherein the fine particles are ununiformly contained by the layer.

[Supplementary Note 38]

An identification and verification method comprising:

acquiring an image of a layer, the layer being formed on an object and containing fine particles and having an irregular planar shape;

extracting a feature quantity dependent on the planar shape of the layer and distribution of the particles as an individual identifier of the object from the image; and comparing the extracted individual identifier with a registered object individual identifier stored in a storage part and, on a basis of a comparison result, determining identification and verification of the object.

[Supplementary Note 39]

The identification and verification method according to Supplementary Note 38, wherein in the extraction:

a region dependent on the planar shape of the layer is determined based on the image; and a feature quantity dependent on distribution of the particles in the region of the layer is extracted as an individual identifier of the object.

[Supplementary Note 40]

The identification and verification method according to Supplementary Note 39, wherein in the region determination:

a coordinate system unique to the layer is determined based on the whole image of the layer;

a normalized image of the layer is generated from the image of the layer on a basis of the unique coordinate system and a predetermined normalized coordinate system; and a predetermined region in the normalized image of the layer is determined as a region dependent on the planar shape of the layer.

[Supplementary Note 41]

The identification and verification method according to Supplementary Note 40, wherein in the coordinate system determination:

a filled image having a planar shape matching the planar shape of the layer is generated; and the unique coordinate system is determined based on a characteristic of the filled image.

[Supplementary Note 42]

The identification and verification method according to Supplementary Note 41, wherein in the filled image generation, the image of the layer is binarized and thereafter a morphologic operation is executed.

[Supplementary Note 43]

The identification and verification method according to Supplementary Note 41 or 42, wherein in the unique coordinate system determination, a center of gravity of the filled image is set as an origin of the unique coordinate system, an axis passing the center of gravity and being parallel to a plane of the image and satisfying that an axial second moment being minimum or maximum is set as an axis of the unique coordinate system, and an area of the filled image is set as a scale of the unique coordinate system.

[Supplementary Note 44]

The identification and verification method according to Supplementary Note 40, wherein in the coordinate system determination:

a low-resolution image obtained by reducing resolution of the image of the layer is generated;

a plurality of key points and scales are detected from the low-resolution image;

orientations of the plurality of key points are detected; and an origin of the unique coordinate system is determined based on positions of the plurality of key points, and a scale and an axis of the unique coordinate system are determined based on statistical values of the scales and the orientations of the plurality of key points.

[Supplementary Note 45]

The identification and verification method according to Supplementary Note 39, wherein in the region determination, the whole planar shape of the layer is determined as a region dependent on the planar shape of the layer.

[Supplementary Note 46]

The identification and verification method according to Supplementary Note 38, wherein in the extraction, the feature quantity is extracted as a first feature quantity from the image, a feature quantity dependent on the planar shape of the layer is extracted as a second feature quantity, and the first feature quantity is integrated with the second feature quantity, whereby an individual identifier of the object is generated.

[Supplementary Note 47]

The identification and verification method according to any of Supplementary Notes 38 to 46, wherein the fine particles are different in reflection characteristic from a material of the layer excluding the fine particles.

[Supplementary Note 48]

The identification and verification method according to any of Supplementary Notes 38 to 47, wherein the fine particles are ununiformly contained by the layer.

[Supplementary Note 49]

A computer program comprising instructions for causing a computer to functions as:

an acquisition part configured to acquire an image of a layer, the layer being formed on an object and containing fine particles and having an irregular planar shape; and an extraction part configured to extract a feature quantity dependent on the planar shape of the layer and distribution of the particles as an individual identifier of the object from the image.

[Supplementary Note 50]

The computer program according to Supplementary Note 49, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 51]

The computer program according to Supplementary Note 50, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 52]

The computer program according to Supplementary Note 51, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 53]

The computer program according to Supplementary Note 52, wherein the filled image generation part is configured to generate the filled image by binarizing the image of the layer and thereafter executing a morphologic operation.

[Supplementary Note 54]

The computer program according to Supplementary Note 52 or 53, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 55]

The computer program according to Supplementary Note 51, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 56]

The computer program according to Supplementary Note 50, wherein the region determination part is configured to determine the whole planar shape of the layer as a region dependent on the planar shape of the layer.

[Supplementary Note 57]

The computer program according to Supplementary Note 49, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 58]

The computer program according to any of Supplementary Notes 49 to 57, wherein the fine particles are different in reflection characteristic from a material of the layer excluding the fine particles.

[Supplementary Note 59]

The computer program according to any of Supplementary Notes 49 to 58, wherein the fine particles are ununiformly contained by the layer.

[Supplementary Note 60]

An individual identification mark formed by a layer, the layer being formed on an object and containing fine particles and having an irregular planar shape, a feature quantity dependent on the planar shape of the layer and distribution of the particles being extracted as an individual identifier of the object from the image of the layer.

[Supplementary Note 61]

The individual identification mark according to Supplementary Note 60, wherein the fine particles are different in reflection characteristic from a material of the layer excluding the fine particles.

[Supplementary Note 62]

The individual identification mark according to Supplementary Note 60 or 61, wherein the fine particles are ununiformly contained by the layer.

[Supplementary Note 63]

An individual identifier registration device comprising:

an attaching part configured to generate a layer containing fine particles and having an irregular planar shape on an object;

an acquisition part configured to acquire an image of the generated layer; and an extraction part configured to extract a feature quantity dependent on the planar shape of the layer and distribution of the particles as an individual identifier of the object from the image.

[Supplementary Note 64]

The individual identifier registration device according to Supplementary Note 63, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 65]

The individual identifier registration device according to Supplementary Note 64, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 66]

The individual identifier registration device according to Supplementary Note 65, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 67]

The individual identifier registration device according to Supplementary Note 66, wherein the filled image generation part is configured to generate the filled image by binarizing the image of the layer and thereafter executing a morphologic operation.

[Supplementary Note 68]

The individual identifier registration device according to Supplementary Note 66 or 67, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 69]

The individual identifier registration device according to Supplementary Note 65, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 70]

The individual identifier registration device according to Supplementary Note 64, wherein the region determination part is configured to determine the whole planar shape of the layer as a region dependent on the planar shape of the layer.

[Supplementary Note 71]

The individual identifier registration device according to Supplementary Note 63, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 72]

The individual identifier registration device according to any of Supplementary Note 63 to 71, comprising an individual identifier registration part configured to register the extracted individual identifier as a registered object individual identifier to a storage part.

[Supplementary Note 73]

The individual identifier registration device according to any of Supplementary Note 63 to 72, wherein the fine particles are different in reflection characteristic from a material of the layer excluding the fine particles.

[Supplementary Note 74]

The individual identifier registration device according to any of Supplementary Note 63 to 73, wherein the fine particles are ununiformly contained by the layer.

[Supplementary Note 75]

The individual identifier registration device according to any of Supplementary Note 63 to 74, wherein the attaching part is a pen using ink containing the particles.

[Supplementary Note 76]

An individual identifier registration method comprising:

generating a layer containing fine particles and having an irregular planar shape on an object;

acquiring an image of the generated layer; and extracting a feature quantity dependent on the planar shape of the layer and distribution of the particles as an individual identifier of the object from the image.

[Supplementary Note 77]

The individual identifier registration method according to Supplementary Note 76, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 78]

The individual identifier registration method according to Supplementary Note 77, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 79]

The individual identifier registration method according to Supplementary Note 78, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 80]

The individual identifier registration method according to Supplementary Note 79, wherein the filled image generation part is configured to generate the filled image by binarizing the image of the layer and thereafter executing a morphologic operation.

[Supplementary Note 81]

The individual identifier registration method according to Supplementary Note 79 or 80, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 82]

The individual identifier registration method according to Supplementary Note 78, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 83]

The individual identifier registration method according to Supplementary Note 77, wherein the region determination part is configured to determine the whole planar shape of the layer as a region dependent on the planar shape of the layer.

[Supplementary Note 84]

The individual identifier registration method according to Supplementary Note 76, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 85]

The individual identifier registration method according to any of Supplementary Notes 76 to 84, comprising registering the extracted individual identifier as a registered object individual identifier to a storage part.

[Supplementary Note 86]

The individual identifier registration method according to any of Supplementary Notes 76 to 85, wherein the fine particles are different in reflection characteristic from a material of the layer excluding the fine particles.

[Supplementary Note 87]

The individual identifier registration method according to any of Supplementary Notes 76 to 86, wherein the fine particles are ununiformly contained by the layer.

[Supplementary Note 88]

The individual identifier registration method according to any of Supplementary Notes 76 to 87, wherein generation of the layer is performed with a pen using ink containing the particles.

[Supplementary Note 89]

An individual identifier management system comprising the individual identifier registration device according to any of Supplementary Notes 63 to 75 and the identification and verification device according to any of Supplementary Notes 63 to 75.

[Supplementary Note 90]

An individual identifier management method executing the individual identifier registration method according to any of Supplementary Notes 76 to 88 and the identification and verification method according to Supplementary Notes 38 to 48.

[Supplementary Note 91]

An individual identifier management device comprising:

an acquisition part configured to acquire an image of a layer, the layer being formed on an object and containing fine particles and having an irregular planar shape; and an extraction part configured to extract a feature quantity dependent on the planar shape of the layer and distribution of the particles as an individual identifier of the object from the image.

[Supplementary Note 92]

The individual identifier management device according to Supplementary Note 91, wherein the extraction part includes:

a region determination part configured to determine a region dependent on the planar shape of the layer based on the image; and a feature quantity extraction part configured to extract a feature quantity dependent on distribution of the particles in the region of the layer as an individual identifier of the object.

[Supplementary Note 93]

The individual identifier management device according to Supplementary Note 92, wherein the region determination part includes:

a coordinate system determination part configured to determine a coordinate system unique to the layer based on the whole image of the layer;

a normalized image generation part configured to generate a normalized image of the layer from the image of the layer on a basis of the unique coordinate system and a predetermined normalized coordinate system; and a fixed region determination part configured to determine a predetermined region in the normalized image of the layer as a region dependent on the planar shape of the layer.

[Supplementary Note 94]

The individual identifier management device according to Supplementary Note 93, wherein the coordinate system determination part includes:

a filled image generation part configured to generate a filled image having a planar shape matching the planar shape of the layer; and a filled image processing part configured to determine the unique coordinate system based on a characteristic of the filled image.

[Supplementary Note 95]

The individual identifier management device according to Supplementary Note 94, wherein the filled image generation part is configured to generate the filled image by binarizing the image of the layer and thereafter executing a morphologic operation.

[Supplementary Note 96]

The individual identifier management device according to Supplementary Note 94 or 95, wherein the filled image processing part is configured to set a center of gravity of the filled image as an origin of the unique coordinate system, set an axis passing the center of gravity and being parallel to a plane of the image and satisfying that an axial second moment being minimum or maximum as an axis of the unique coordinate system, and set an area of the filled image as a scale of the unique coordinate system.

[Supplementary Note 97]

The individual identifier management device according to Supplementary Note 93, wherein the coordinate system determination part includes:

a resolution reduction part configured to generate a low-resolution image obtained by reducing resolution of the image of the layer;

a key point and scale detection part configured to detect a plurality of key points and scales from the low-resolution image;

an orientation detection part configured to detect orientations of the plurality of key points; and a statistical processing part configured to determine an origin of the unique coordinate system based on positions of the plurality of key points and determine a scale and an axis of the unique coordinate system based on statistical values of the scales and the orientations of the plurality of key points.

[Supplementary Note 98]

The individual identifier management device according to Supplementary Note 92, wherein the region determination part is configured to determine the whole planar shape of the layer as a region dependent on the planar shape of the layer.

[Supplementary Note 99]

The individual identifier management device according to Supplementary Note 91, wherein the extraction part is configured to extract the feature quantity as a first feature quantity from the image, extract a feature quantity dependent on the planar shape of the layer as a second feature quantity, and integrate the first feature quantity with the second feature quantity, thereby generating an individual identifier of the object.

[Supplementary Note 100]

The individual identifier management device according to any of Supplementary Notes 91 to 99, wherein the fine particles are different in reflection characteristic from a material of the layer excluding the fine particles.

[Supplementary Note 101]

The individual identifier management device according to any of Supplementary Notes 91 to 100, wherein the fine particles are ununiformly contained by the layer.

[Supplementary Note 102]

The individual identifier management device according to any of Supplementary Notes 91 to 101, comprising a determination part configured to compare the individual identifier extracted by the extraction part with a registered object individual identifier stored in a storage part and, on a basis of a comparison result, determine identification and verification of the object.

[Supplementary Note 103]

The individual identifier management device according to any of Supplementary Notes 91 to 101, comprising an attaching part configured to generate the layer on the object.

DESCRIPTION OF NUMERALS 100, 500, 600, 700 individual identifier extraction device
101 acquisition part
102 extraction part
110, 210, 310, 410, 510, 610, 710 object
111, 211, 311, 411, 511, 611, 711 layer
112, 212, 312, 412, 512, 612, 712 particle 120, 520, 620, 720 individual identifier
200, 800 individual identifier registration device
201 attaching part
202, 301, 831, 931 individual identifier extraction part
203, 832, 934 individual identifier registration part
220, 320, 420, 542, 820, 920 storage part
300 identification and verification device
302 determination part
330, 430 determination result
400, 900 individual identifier management system
401 individual identifier registration device
402 identification and verification device
501, 601, 701, 802, 902 camera terminal
502, 602, 702, 803, 904 processing device
531, 631, 731 image acquisition part
532, 632, 732 image storage part
533 coordinate system determination part
534 normalized image generation part
535 normalized image storage part
536 fixed region determination part
537, 634 feature quantity extraction part
540 information processing apparatus
541 arithmetic processing part
543 program
551 resolution reduction part
552 low-resolution image storage part
553 key point and scale detection part
554 orientation detection part
555 statistical processing part
561 binarizing part
562 binary image storage part
563 filled image generation part
564 filled image storage part
565 shape processing part
633 layer region determination part
733 first feature quantity extraction part
734 second feature quantity extraction part
735 feature quantity integration part
801, 901, 1000 pen
810 product
811, 911 dot
840 belt conveyor
910 specific object
932 control part
935 identification and verification part
940 locker
950 input device
1001 housing
1002 pen tip part
1003, 1004 ink
1005 partition wall
1006 cap
G11, G21, G31 layer image
G12, G22 low-resolution layer image
G13, G23 scale histogram
G14, G24 orientation histogram
G15, G25 layer image with unique coordinate system
G16, G26 layer image with unique coordinate system
G17, G27 layer image with normalized coordinate system
G18, G28 layer image with normalized image and feature quantity extraction region
G32 binarized layer image
G33 filled image

What is claimed is:

1. An individual identifier extraction device comprising:
a non-transitory computer-readable storage medium configured to store one or more instructions; and
a processor configured to execute the stored instructions for:
acquiring an image of a layer, the layer being formed on an object and containing fine particles and having an irregular planar shape; and
extracting a feature quantity dependent on the planar shape of the layer and distribution of the particles as an individual identifier of the object from the image,
wherein the extracting includes:
determining a region dependent on the planar shape of the layer based on the image; and
extracting a feature quantity dependent on distribution of the particles in the region of the layer as an individual identifier of the object,
wherein the region determination includes:
determining a coordinate system unique to the layer based on the whole image of the layer;
generating a normalized image of the layer from the image of the layer on a basis of the unique coordinate system and a predetermined normalized coordinate system; and
determining a predetermined region in the normalized image of the layer as a region dependent on the planar shape of the layer.

2. The individual identifier extraction device according to claim 1, wherein the coordinate system determination includes:
generating a filled image having a planar shape matching the planar shape of the layer; and
determining the unique coordinate system based on a characteristic of the filled image.

3. The individual identifier extraction device according to claim 2, wherein the filled image is generated by binarizing the image of the layer and thereafter executing a morphologic operation.

4. The individual identifier extraction device according to claim 2, wherein the determining the coordinate system comprises:
setting a center of gravity of the filled image as an origin of the unique coordinate system,
setting an axis passing the center of gravity and being parallel to a plane of the image and satisfying that an axial second moment being minimum or maximum as an axis of the unique coordinate system, and
setting an area of the filled image as a scale of the unique coordinate system.

5. The individual identifier extraction device according to claim 1, wherein the coordinate system determination includes:
generating a low-resolution image obtained by reducing resolution of the image of the layer;
detecting a plurality of key points and scales from the low-resolution image;
detecting orientations of the plurality of key points;
determining an origin of the unique coordinate system based on positions of the plurality of key points; and
determining a scale and an axis of the unique coordinate system based on statistical values of the scales and the orientations of the plurality of key points.

6. An individual identifier extraction device comprising:
a non-transitory computer-readable storage medium configured to store one or more instructions; and
a processor configured to execute the stored instructions for:
acquiring an image of a layer, the layer being formed on an object and containing fine particles and having an irregular planar shape; and extracting a feature quantity dependent on the planar shape of the layer and distribution of the particles as an individual identifier of the object from the image,
wherein the extracting includes:
extracting the feature quantity as a first feature quantity from the image,
extracting a feature quantity dependent on the planar shape of the layer as a second feature quantity, and
integrating the first feature quantity with the second feature quantity, thereby generating an individual identifier of the object.

7. An individual identifier extraction method comprising:
acquiring an image of a layer, the layer being formed on an object and containing fine particles and having an irregular planar shape; and
extracting a feature quantity dependent on the planar shape of the layer and distribution of the particles as an individual identifier of the object from the image,
wherein in the extraction:
a region dependent on the planar shape of the layer is determined based on the image; and
a feature quantity dependent on distribution of the particles in the region of the layer is extracted as an individual identifier of the object,
wherein in the region determination:
a coordinate system unique to the layer is determined based on the whole image of the layer;
a normalized image of the layer is generated from the image of the layer on a basis of the unique coordinate system and a predetermined normalized coordinate system; and
a predetermined region in the normalized image of the layer is determined as a region dependent on the planar shape of the layer.

8. An individual identifier extraction method comprising:
acquiring an image of a layer, the layer being formed on an object and containing fine particles and having an irregular planar shape; and
extracting a feature quantity dependent on the planar shape of the layer and distribution of the particles as an individual identifier of the object from the image,
wherein in the extraction, the feature quantity is extracted as a first feature quantity from the image, a feature quantity dependent on the planar shape of the layer is extracted as a second feature quantity, and the first feature quantity is integrated with the second feature quantity, whereby an individual identifier of the object is generated.

9. An identification and verification device comprising:
a non-transitory computer-readable storage medium configured to store one or more instructions; and
a processor configured to execute the stored instructions for:
acquiring an image of a layer, the layer being formed on an object and containing fine particles and having an irregular planar shape;
extracting a feature quantity dependent on the planar shape of the layer and distribution of the particles as an individual identifier of the object from the image; and
comparing the extracted individual identifier with a registered object individual identifier stored in the non-transitory computer-readable storage medium and, on a basis of a comparison result, determine identification and verification of the object,
wherein the extracting includes:
extracting the feature quantity as a first feature quantity from the image,
extracting a feature quantity dependent on the planar shape of the layer as a second feature quantity, and
integrating the first feature quantity with the second feature quantity, thereby generating an individual identifier of the object.

* * * * *